United States Patent [19]
Conant et al.

[11] Patent Number: 5,315,592
[45] Date of Patent: May 24, 1994

[54] PARALLEL BRIDGING

[75] Inventors: George E. Conant, Acton; Steven H. Sherry, Lynnfield; Scott G. Wasson, Shrewsbury, all of Mass.

[73] Assignee: Xyplex Inc., Boxborough, Mass.

[21] Appl. No.: 872,516

[22] Filed: Apr. 23, 1992

[51] Int. Cl.$^5$ .................................. H04J 3/02
[52] U.S. Cl. .................. 370/85.13; 370/94.1
[58] Field of Search ............. 370/85.13, 85.14, 94.1, 370/85.1, 85.9, 85.12, 60, 60.1, 99.3

[56] References Cited

U.S. PATENT DOCUMENTS

| | | | |
|---|---|---|---|
| 4,809,265 | 2/1989 | Hart et al. | 370/85.13 |
| 4,811,337 | 3/1989 | Hart | 370/85.13 |
| 4,922,503 | 5/1990 | Leone | 370/85.13 |
| 4,972,409 | 11/1990 | Backes et al. | 370/85.13 |
| 5,018,137 | 5/1991 | Backes et al. | 370/85.13 |

Primary Examiner—Douglas W. Olms
Assistant Examiner—Ajit Patel
Attorney, Agent, or Firm—Fish & Richardson

[57] ABSTRACT

A network with parallel bridges transmits information packets over parallel paths between first and second terminals in a network having other terminals while maintaining conformity with a protocol that precludes establishing loops formed by links between terminals that allow information packets to recirculate indefinitely. There is a first pair of bridges with each bridge connected to a respective one of the first and second terminals and interconnected by a first link. There is a second pair of bridges each connected to a respective one of the first and second terminals and interconnected by a second link. At least one bridge in each of the first pair of bridges and the second pair of bridges is designatable as a master bridge and has a forwarding/filtering module for forwarding and filtering information packet transfer between the first and second terminals, a topology recognition/traffic assignment module for sensing the existence of parallel transmission paths between the first and second terminals and assigning information packets to respective ones of the parallel transmission paths for transfer between the first and second terminals, and a spanning tree module for providing a spanning tree bridge identifier signal. A spanning tree bridge identifier signal sensor senses the spanning tree bridge identifier signals and designates as a master that bridge having the spanning tree bridge identifier signal meeting a pre-determined condition.

5 Claims, 8 Drawing Sheets

Microfiche Appendix Included (1 Microfiche, 74 pages)

FIG. 9

| field | length (in octets) |
|---|---|
| TYPE | 1 |
| VERSION | 1 |
| LAN-ID | 8 |
| STABLE-FLAG | 1 |

FIG. 10

| field | length (in octets) |
|---|---|
| TYPE | 1 |
| VERSION | 1 |
| CONFIG | 2 |
| STP-STATE | 1 |
| GROUP-SIZE | 1 |
| REMOTE-LAN-ID | 8 |
| GROUP-MASTER-ID | 8 |
| GROUPS | VAR |

FIG. 11

| field | length (in octets) |
|---|---|
| NEIGHBOR-ID | 8 |
| NEIGHBOR-STATE | 1 |
| undefiend | 3 |
| NEIGHBOR-PATH-COST | 4 |
| NEIGHBOR-BUCKETS | 4 |
| PARTNER-ID | 8 |
| PARTNER-STATE | 1 |
| undefined | 3 |
| PARTNER-PATH-COST | 4 |
| PARTNER-BUCKETS | 4 |

FIG. 12

| field | length (in octets) |
|---|---|
| TYPE | 1 |
| VERSION | 1 |
| CONFIG | 2 |
| REMOTE-LAN-ID | 8 |
| SELF-ID | 8 |
| SELF-STATE | 1 |
| undefined | 3 |
| SELF-PATH-COST | 4 |
| SELF-BUCKETS | 4 |
| PARTNER-ID | 8 |
| PARTNER-STATES | 1 |
| undefined | 3 |
| PARTNER-PATH-COST | 4 |
| PARTNER-BUCKETS | 4 |

FIG. 13

| field | length (in octets) |
|---|---|
| TYPE | 1 |
| VERSION | 1 |
| CONFIG | 2 |
| STP-STATE | 1 |
| GROUP-SIZE | 1 |
| COMBINED-PATH-COST | 4 |
| LOCAL-LAN-ID | 8 |
| GROUP-MASTER-ID | 8 |
| SELF-ID | 8 |
| SELF-STATE | 1 |
| undefined | 3 |
| SELF-PATH-COST | 4 |
| SELF-BUCKETS | 4 |
| GROUP | var |

FIG. 14

| field | length (in octets) |
|---|---|
| NEIGHBOR | 8 |
| NEIGHBOR-STATE | 1 |
| undefined | 3 |
| NEIGHBOR-PATH-COST | 4 |
| NEIGHBOR-BUCKETS | 4 |
| PARTNER-ID | 8 |
| PARTNER-STATE | 1 |
| undefined | 3 |
| PARTNER-PATH-COST | 4 |
| PARTNER-BUCKETS | 4 |

PARALLEL BRIDGING

REFERENCE TO MICROFICHE APPENDIX

The application includes a microfiche appendix pursuant to 37 CFR §1.96(b) containing 1 microfiche with 74 frames.

This invention relates to bridges used to transmit and receive information from one local area network to another local area network.

In one typical arrangement, a bridge is connected to a local area network (LAN) and used to (i) transmit packets of information from that LAN over a wide area network (WAN) link or other LAN link to a partner bridge which is connected to another LAN and (ii) receive information packets transmitted over the WAN link by the partner bridge. The WAN link is typically a phone line. The LANs in this arrangement are referred to as remote because they are usually located in different cities.

A common network configuration may include three LANs in three different cities (i.e., a first city, a second city, and a third city), a bridge connected to each LAN (i.e., a first bridge, a second bridge, and a third bridge), and links connecting each bridge to the other two bridges. All bridges typically embody the IEEE 802.1d communication protocol. In this exemplary network configuration, the IEEE 802.1d protocol requires blocking one link as a communication path so that no "loops" exist in the system that might continuously recirculate information packets. In other words, the IEEE 802.1d protocol allows only one path to exist between any two LANs. The IEEE 802.1d protocol also accommodates a single link failure by activating the blocked link if either of the active links fails. The nonuse of the blocked link in this exemplary network configuration is referred to as the triangulation problem.

A data-link-sharing product from Vitalink Communications Corporation allows use of the normally blocked link while avoiding data recirculation in the loop. Reference is also made to U.S. Pat. No. 4,811,337.

If a fourth city with a fourth LAN and a fourth bridge is added and link failure tolerance is required, the fourth city cannot be linked to the first city by simply adding a fifth bridge to the first city and connecting this fifth bridge to the fourth bridge at the fourth city by a fourth link. The IEEE 802.1d protocol requires sixth and seventh bridges at the first and fourth cities, respectively, intercoupled by a fifth link to assure single link failure tolerance between the first and fourth cities. While the IEEE 802.1d protocol avoids the looping problem in this configuration by blocking either the fourth or fifth link, a different problem arises, referred to as the parallel problem. Nonuse of the blocked one of the fourth and fifth links in parallel between the first and fourth cities is referred to as the parallel problem.

According to the invention, there is transmission of information packets over parallel paths between first and second terminals in a network having other terminals while maintaining conformity with a protocol that precludes establishing loops formed by links between terminals that allow information packets to recirculate indefinitely. A first pair of bridges are interconnected by a first link and connected to a respective one of the first and second terminals. A second pair of bridges are interconnected by a second link with each bridge connected to a respective one of the first and second terminals. At least one bridge in each of the first pair of bridges and the second pair of bridges is designatable as a master bridge. All bridges, including the master bridge, have a forward/filtering module for forwarding and filtering information packet transfer between the first and second terminals, a topology recognition/traffic assignment module for sensing the existence of parallel transmission paths between the first and second terminals and assigning information packets to respective ones of the parallel transmission paths for transfer between the first and second terminals, and a spanning tree module for providing a spanning tree bridge identifier signal. A spanning tree bridge identifier signal sensor senses the spanning tree identifier signals and designates as a master that bridge having the spanning tree bridge identifier signal meeting a predetermined condition. Typically the spanning tree bridge identifier signal sensor designates as the master that bridge having the spanning tree bridge identifier signal with a value that is one of lower and higher than the value of all other spanning tree bridge identifier signals for other bridges in parallel paths between the first and second terminals.

Preferably each bridge is assigned at least one unique bucket value. Each information packet is processed to provide an observed bucket value. The assigned and observed bucket values are compared to provide an assignment signal that assigns the associated packet signal for transmission over that one of the parallel paths characterized by an assigned bucket value that bears a predetermined relationship to the observed bucket value. Preferably the data transmission over each of the parallel paths is monitored to provide an average utilization signal that may be processed to reassign assigned bucket values to one or more of the parallel paths to improve the efficiency of data transmission.

Other features and advantages of the invention will become apparent from the following detailed description when read in connection with the accompanying drawing in which.

Figures 7, 8:
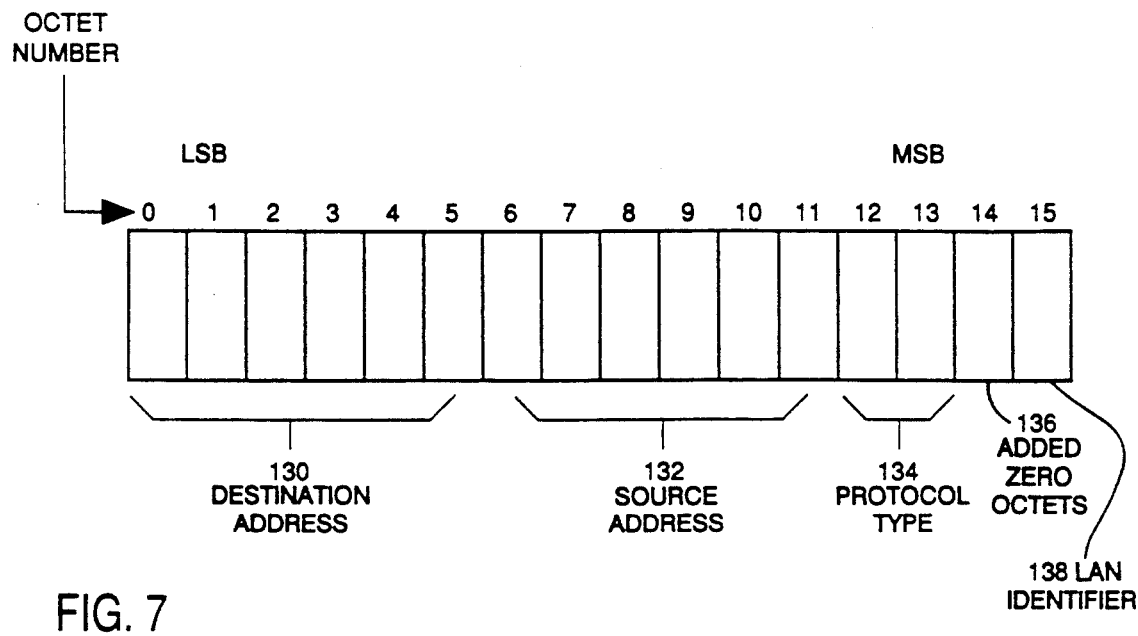
FIG. 7 is a diagram showing the format of information included in a packet header of an Ethernet II message packet used in the invention.

FIG. 8 is a table listing the names and possible values associated with three fields common to some message packets; and FIGS. 9 through 14 are tables showing the various fields in a LAN identifier message (FIG. 9), a LAN master/slave message (FIGS. 10 and 11), a LAN peer message (FIG. 12), and a WAN message (FIGS. 13 and 14).

Figure 1:
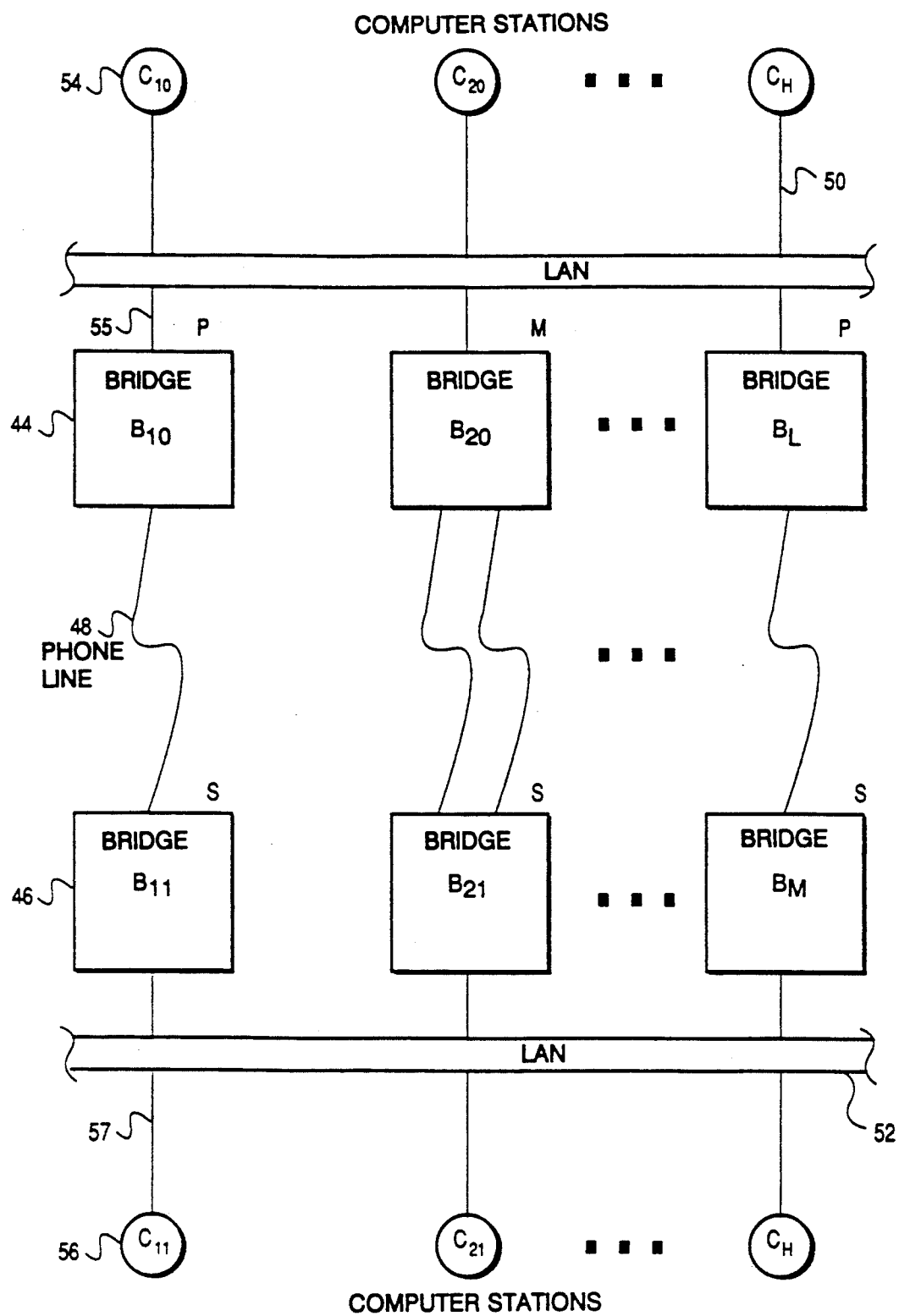
FIG. 1 is a block diagram of a system utilizing parallel bridges in accordance with the present invention where the local area networks are remote.

Referring to FIG. 1, bridges 44 (numbered by tens from $B_{10}$ to $B_L$) and bridges 46 (numbered by tens from $B_{11}$ to $B_M$) are connected to each other by at least one phone line (i.e., WAN link) 48 and are connected to local area networks 50, 52 by LAN links 55, 57, respectively. Thus, bridges 44 and 46 establish parallel communication paths between a plurality of computer stations 54 (numbered by tens from $C_{10}$ to $C_H$) on LAN 50 and a plurality of computer stations 56 (numbered by tens from $C_{11}$ to $C_I$) on LAN 52.

Figure 2:
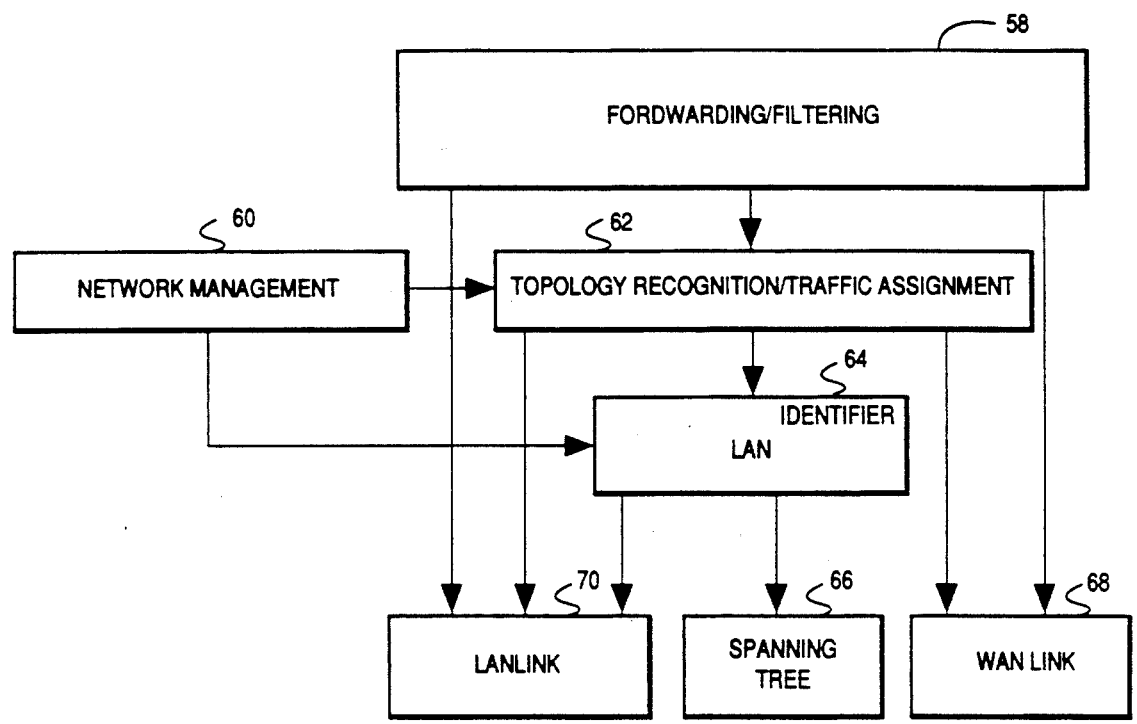
FIG. 2 is a block diagram of the functional modules contained in the bridge of the present invention.
Figure 3:
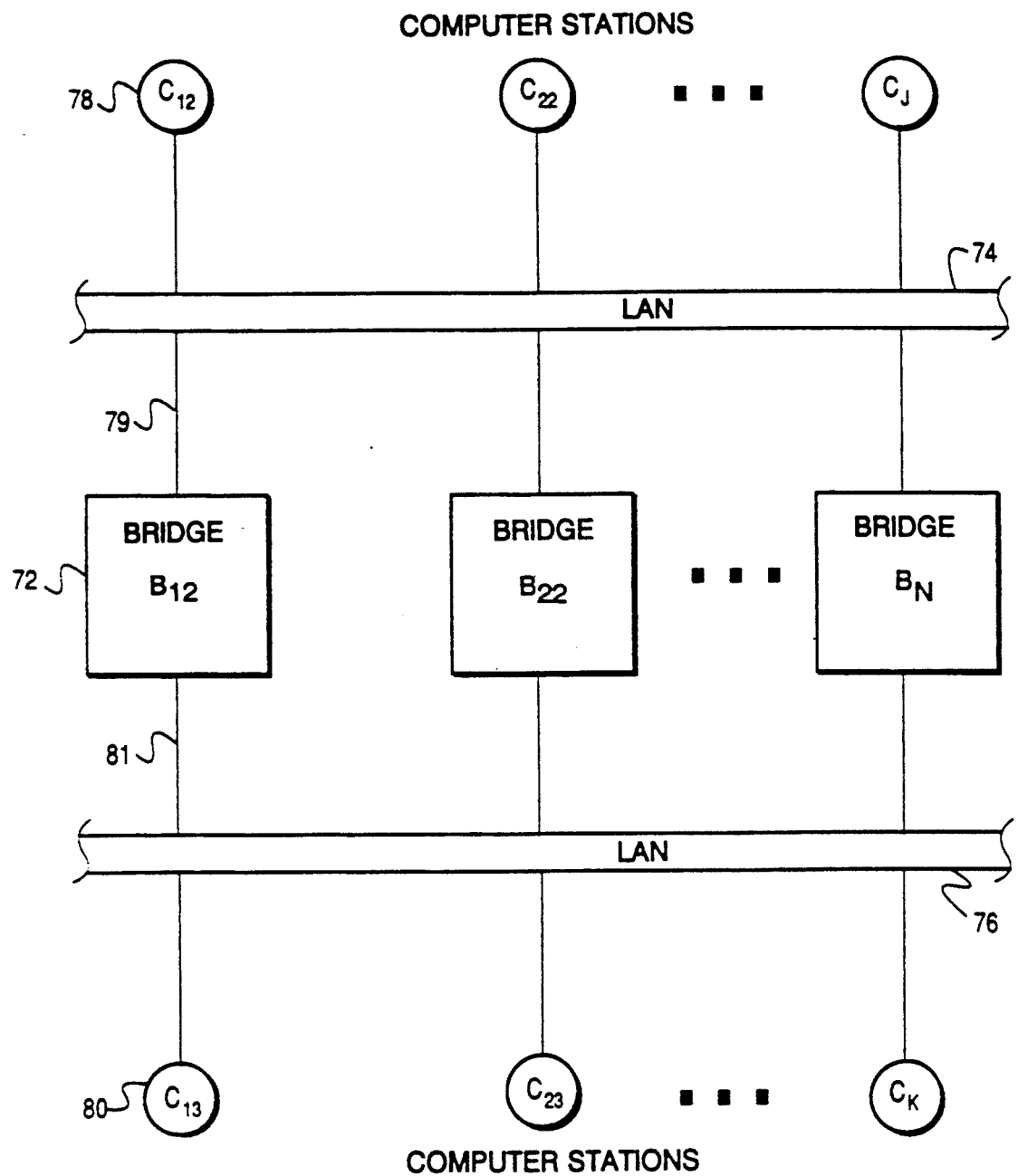
FIG. 3 is a block diagram of a second embodiment of a system utilizing parallel bridges in accordance with the present invention where the local area networks are local.

FIG. 2 illustrates functional modules contained in each bridge 44, 46 (also 72, FIG. 3). Referring to FIG. 2, functionally, each bridge may comprise a forwarding/filtering module 58, a network management module 60, a topology recognition/traffic assignment module 62, a LAN address module 64, a spanning tree module 66, a WAN link module 68, and a LAN link module 70. The higher level modules in FIG. 2 control the lower level modules, i.e, a higher level module may request a lower level module to perform a function and return a result. However, a lower level module may send unrequested information to a higher level module to inform the higher level module of certain events.

Referring to FIG. 3, bridges 72 (numbered by tens from $B_{12}$ to $B_N$) connect LAN 74 to LAN 76 by using LAN links 79, 81. Thus, bridges 72 establish parallel communication paths between a plurality of computer stations 78 (numbered by tens from $C_{12}$ to $C_J$) on LAN 74 and a plurality of computer stations 80 (numbered by tens from $C_{13}$ to $C_K$) on LAN 76.

Having described the physical arrangement of a system according to the invention, its mode of operation will be described. The operation of bridges used to create at least two parallel communication paths between two LANs in accordance with the present invention is illustrated by the flow chart in FIG. 4 of data transfer in the embodiment of FIG. 1.

Figure 4:
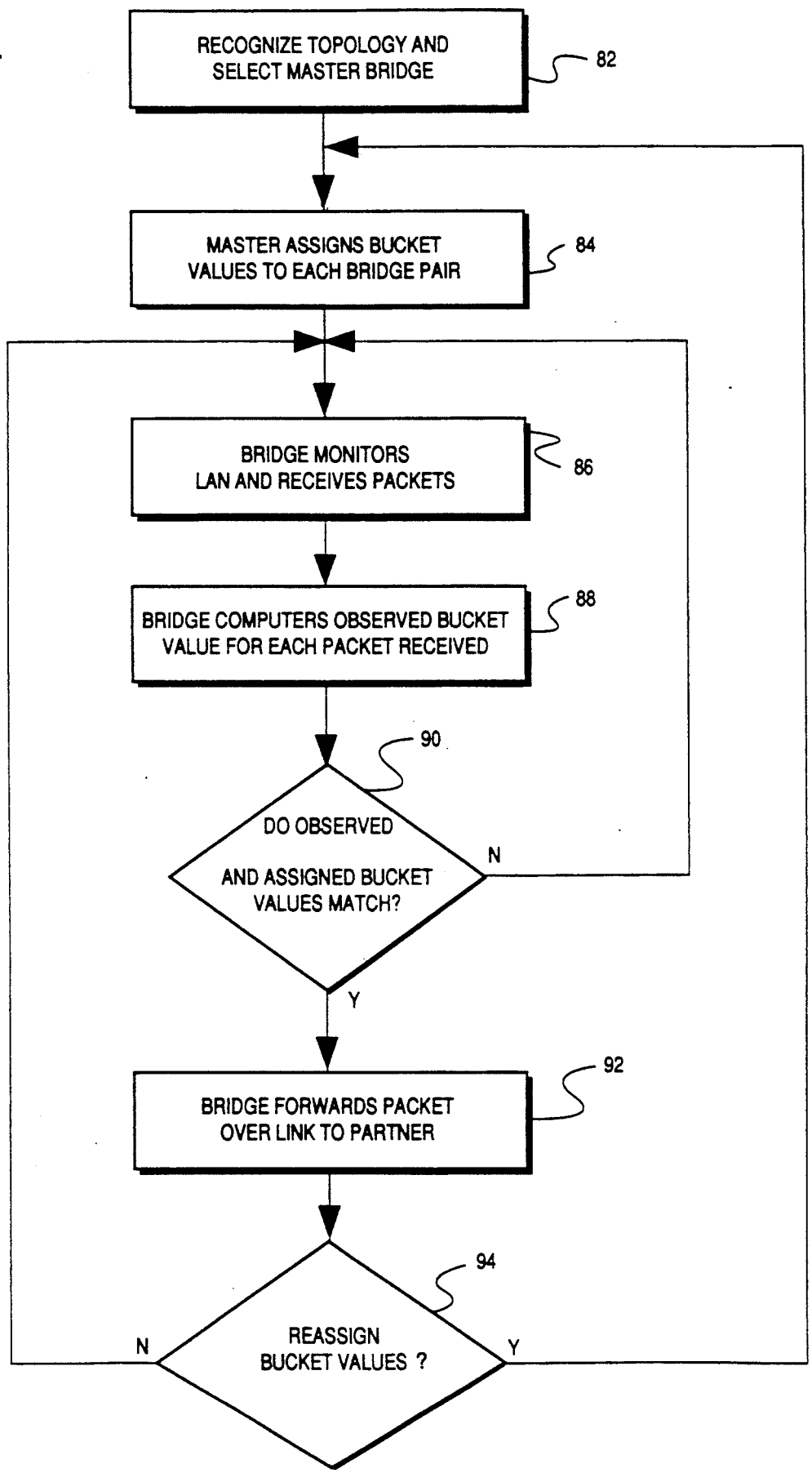
FIG. 4 is a flow chart that illustrates the high-level operation of parallel bridges in the embodiment of FIG. 1.

Referring to FIG. 4, the first step 82 in achieving functioning parallel communication paths between two LANs is for all bridges to exchange messages in order to become aware of the parallel topology and to select a master bridge from the bridges in the parallel topology. The next step 84 is for the master bridge to assign unique bucket values to each bridge pair in the parallel topology. A bucket value is some value from some range that can be the result of some computation. Two bridges connected to different LANs and connected to each other by at least one WAN link constitute a bridge pair. The next step 86 is for each bridge in the parallel topology to constantly monitor the LAN to which it is connected and receive each packet of information put on the LAN by the computer stations connected to the LAN. Next, for step 88 the bridge computes an "observed" bucket value for each information packet it receives. In the next decision step 90, the bridge determines if the observed bucket value matches the assigned bucket value (i.e., the bucket value assigned to the bridge by the master bridge). If the observed and assigned bucket values match, the bridge proceeds to step 92, and the information packet is forwarded over the WAN link to the other bridge in the bridge pair. Otherwise, the bridge loops back to step 86 and processing continues as described above.

The use of assigned and observed bucket values effectively distributes the traffic of information packets to each bridge pair in the parallel topology. The combined throughput of information packets across all of the parallel bridge pairs is potentially greater than the throughput possible across a single bridge pair.

The next step 94 involves a decision by the master bridge. Specifically, if the master bridge determines, based on actual observed information packet traffic between bridge pairs, that assigned bucket values should be reassigned to achieve more balanced traffic loads on each bridge pair, step 84 is again performed and processing continues as described above. Otherwise, step 94 loops back to step 86 and processing continues as described above.

Even after functioning parallel communication paths have been established, the bridges in the parallel topology continue to periodically exchange messages similar to when the bridges were trying to establish the parallel topology and select a master bridge (step 82). These messages serve to inform the bridges in the parallel topology of certain critical events, such as a WAN link either "coming up" (i.e., becoming functional) or "going down", or a bridge in the parallel topology going down. If a critical event occurs, step 82 is again performed by all bridges and processing continues as described above.

In an exemplary embodiment there are 32 unique possible bucket values capable of supporting up to 32 parallel bridge pairs. With $2^{48}$ possible unique bucket values, up to $2^{48}$ parallel bridge pairs may be supported.

The operation of the parallel bridge topology according to the invention complies with the IEEE 802.1d protocol. The bridges in the parallel topology of the invention operate to insure that if the IEEE 802.1d protocol designates any of the parallel links for transmission, the designated link always connects the bridge pair that includes the master bridge. Even though information packet traffic may be distributed to each bridge pair and interconnecting link in the parallel topology, once the bridge pair that includes the master bridge is designated, it appears to any other bridges outside the parallel topology that the bridge pair that includes the master bridge is the only bridge pair transferring data without loop recirculation in accordance with the IEEE 802.1d protocol.

The bridges described above may also be used in a similar system, such as that illustrated in FIG. 3. Whereas LANs 50, 52 of FIG. 1 are considered to be remote (i.e., located in different cities), LANs 74, 76 of FIG. 3 are local (i.e., located in the same physical building or at least in the same general area). When used with local LANs, as in FIG. 3, each bridge 72 is connected directly to both LANs 74, 76 by LAN links 79, 81. The operation of parallel bridge pairs connected between local LANs is similar to the operation of parallel bridge pairs. However, rather than blocking a WAN link, the IEEE 802.1d operation normally blocks the use of at least one LAN link in all but one of the bridges.

The operation of the functional modules included in a bridge is described below.

Referring to FIG. 2, there is shown a block diagram of functional modules suitable for use in systems according to the invention. Forwarding/filtering module 58 provides standard bridge forwarding and filtering functions. In this example network management module 60 provides operator control over the operation of the bridges in the parallel topology. Topology recognition/traffic assignment module 62 provides recognition of the parallel topology and assignment of information packet traffic across the bridge pairs in the parallel topology. LAN identifier module 64 provides real-time establishment of an address for each LAN to which a bridge in the parallel topology is connected. Spanning tree module 66 provides information about and control over the operation of the "spanning tree algorithm" which operates under the IEEE 802.1d communication protocol. WAN link module 68 provides access to a WAN link for transmission and reception of information packets between a bridge pair in the parallel topology. LAN link module 70 provides access to the LAN link for transmission and reception of information packets between a bridge in the parallel topology and a LAN to which the bridge is connected.

The network management, spanning tree, WAN link, and LAN link modules are known in the art and are not described in detail herein to avoid obscuring the inventive concepts.

To enable topology recognition/traffic assignment module 62 to recognize the parallel topology and select a master bridge, a unique LAN identifier for each LAN to which a bridge is connected is determined by LAN identifier module 64. The LAN identifier is the lowest 8-byte (i.e., 64-bit) "spanning tree bridge identifier" of any bridge in the parallel topology connected to the LAN and adhering to the present invention. A LAN identifier message is periodically "multicast" between bridges on the same LAN in order to compare spanning tree bridge identifiers and determine the LAN identifier for each LAN. All bridges connected to the same LAN form an 8-byte spanning tree bridge identifier by concatenating a 2-byte (i.e., 16-bit) bridge priority value with a 6-byte (i.e., 48-bit) address value. The 2-byte bridge priority enters the most significant positions, and the 6-byte address enters in the least significant positions when forming the 8-byte spanning tree bridge identifier. An operator assigns a 2-byte bridge priority value to each bridge in accordance with the IEEE 802.1d protocol. Under the IEEE 802.3 (i.e., Ethernet) network communication protocol, a unique 6-byte address is assigned, usually at the factory, to every device connected to a LAN by the IEEE 802.3 protocol. (Note that in the case of local LANs, e.g., FIG. 3, where bridges are directly connected to more than one LAN by LAN links, the "local" bridges are capable of determining a unique LAN identifier for each local LAN to which they are directly connected.)

Still referring to LAN identifier module 64, initially each bridge transmits as if its own spanning tree bridge identifier is the LAN identifier, and multicasts a protocol message to other bridges connected to the same LAN indicating that its own spanning tree bridge identifier is the lowest spanning tree bridge identifier known. If a bridge receives a protocol message from another bridge that indicates the other bridge has a lower spanning tree bridge identifier, the receiving bridge records the lower spanning tree bridge identifier as the LAN identifier. Eventually, all bridges connected to the same LAN record a common unique LAN identifier for the LAN to which they are connected. The result is that all LANs, which have at least one connected bridge adhering to the present invention, are assigned unique LAN identifiers without any LAN-to-LAN communication.

Topology recognition/traffic assignment module 62 is now ready to recognize the parallel bridge topology and select a master bridge. In order to recognize the parallel topology, each bridge periodically multicasts messages onto its LAN link or links. If the bridge is a remote bridge, it also periodically transmits a directed message on its WAN link or links to its bridge partner. The messages periodically transmitted on the WAN link(s) contain the LAN identifier of the LAN to which the sending bridge is connected. The messages multicast on the LAN link(s) contain the LAN identifier of the LAN to which the sending bridge's partner is connected. All bridges connected to the same LAN whose bridge partners all have the same LAN identifier are in parallel.

These messages also carry information possessed by each bridge as to which bridge in the parallel topology has the lowest spanning tree bridge identifier. The bridge with the lowest spanning tree bridge identifier is designated the master bridge among all bridges in the parallel topology. When first started, the information in each bridge indicates that bridge is the master bridge. As messages are exchanged, each bridge that is not the master bridge will eventually receive a message identifying the correct master bridge, and eventually all messages will identify the same bridge as the master bridge. It does not matter to which LAN the master bridge is connected. Because of the contents of the 8-byte spanning tree bridge identifier, only one master bridge is selected for the parallel topology. Because an operator assigns the 2-byte bridge priority value to each bridge, the operator can cause a particular bridge to be selected as the master bridge.

It is convenient to refer to all the bridges in the parallel topology that are not the master bridge, but are on the same LAN as the master bridge, as peer bridges, and all bridges in the parallel topology that are not on the same LAN as the master bridge, as slave bridges. Referring to FIG. 1, if the master bridge is bridge $B_{20}$, all other bridges connected to LAN 50 by LAN links 55 (i.e., $B_{10}$, $B_L$, etc.) are peer bridges, and bridges $B_{11}$ through $B_M$ are slave bridges. In FIG. the master bridge, peer bridges, and slave bridges are denoted by M, P, and S, respectively.

Topology recognition/traffic assignment module 62 uses the periodically multicast messages not only to recognize the parallel topology and select a master bridge, but also to ascertain a "cost" associated with each LAN and WAN link in the parallel topology. Usually the cost of using a link is inversely proportional to the speed (i.e., data rate and/or bandwidth) of the link. Specifically, faster links usually have lower use costs than slower links. The IEEE 802.1d protocol determines all link costs and preferably identifies a collection of links in which the total cost for transmitting a particular packet from any point to any other point in the network is minimized.

Typically, in an arrangement with remote LANs, the WAN link costs dominate the LAN link costs, i.e., the LAN links are usually assigned a very low (or zero) cost. However, in an arrangement with local LANs, LAN link costs dominate because no WAN links exist.

After the master bridge receives signals representative of the costs of all the links in the parallel topology, it preferably determines an effective link cost for all of the links combined. The computation used to arrive at the effective link cost is similar to the computation used to determine the equivalent resistor value of resistors in parallel. Therefore, the effective link cost for transmitting over parallel paths is always less than for transmitting on any of the individual links in the parallel topology.

Once the master bridge has determined the effective link cost, it may broadcast this cost in accordance with the IEEE 802.1d protocol. All other bridges in the parallel topology may also broadcast their effective costs in accordance with the IEEE 802.1d protocol. However, bridges in the parallel topology, other than the master bridge, broadcast effective link costs that are greater than the master bridge's effective link cost in order to assure that the link designated as a "forwarding" link in accordance with the IEEE 802.1d protocol is the link connected to the master bridge.

With the parallel topology recognized, the master bridge selected, and effective costs ascertained, topology recognition/traffic assignment module 62 in the master bridge may assign information packets to certain bridge pairs in the parallel topology, i.e., assign traffic.

Referring to FIG. 1, if computer $C_{10}$ sends an information packet to computer $C_{11}$, each bridge 44 receives the packet because all bridges in the parallel topology are what is known as promiscuous receivers on the LAN to which they are connected. Under the IEEE 802.1d protocol, an information packet is transferred to the other LAN over only one path, i.e., duplicate packets should not be received by the other LAN. Therefore, although all bridges 44 receive the packet, only one forwards the packet over a link to its bridge partner and ultimately to the destination computer $C_{11}$. Topology recognition/traffic assignment module 62 and forwarding/filtering module 58 (FIG. 2) control the transfer of packets between the two LANs 50, 52.

Initially, topology recognition/traffic assignment module 62 in the master bridge assigns unique bucket values to each bridge pair in the parallel topology. The bridge pairs use these assigned bucket values to determine if a particular information packet should be forwarded. Forwarding/filtering module 58 in each bridge determines whether or not to forward the packet after computing an "observed" bucket value for the packet. If the observed bucket value matches the assigned bucket value (i.e., the bucket value assigned to the bridge by the master bridge), the information packet is forwarded over a link to the bridge partner. Otherwise, the packet is not forwarded.

Under the IEEE 802.3 or Ethernet protocols, each information packet begins with a 12-byte (i.e., 96-bit) packet header consisting of a 6-byte (i.e., 48-bit) destination address and a 6-byte source address. The 6-byte destination address and the 6-byte source address are used to compute the observed bucket value.

In both IEEE 802.3 and Ethernet, each information packet actually begins with 14 bytes (i.e., 112 bits) where the last 2-byte (i.e., 16-bit) segment is referred to as a "length" field in IEEE 802.3 and a "protocol type" field in Ethernet. The decimal value of the last 2-byte segment identifies it as a length (IEEE 802.3) or a protocol type (Ethernet) field. If the last 2-byte segment is between 0 and 1500 (decimal), it is an IEEE 802.3 length field. If it is between 1501 and 65535 (decimal), it is an Ethernet protocol type field.

Figure 5:
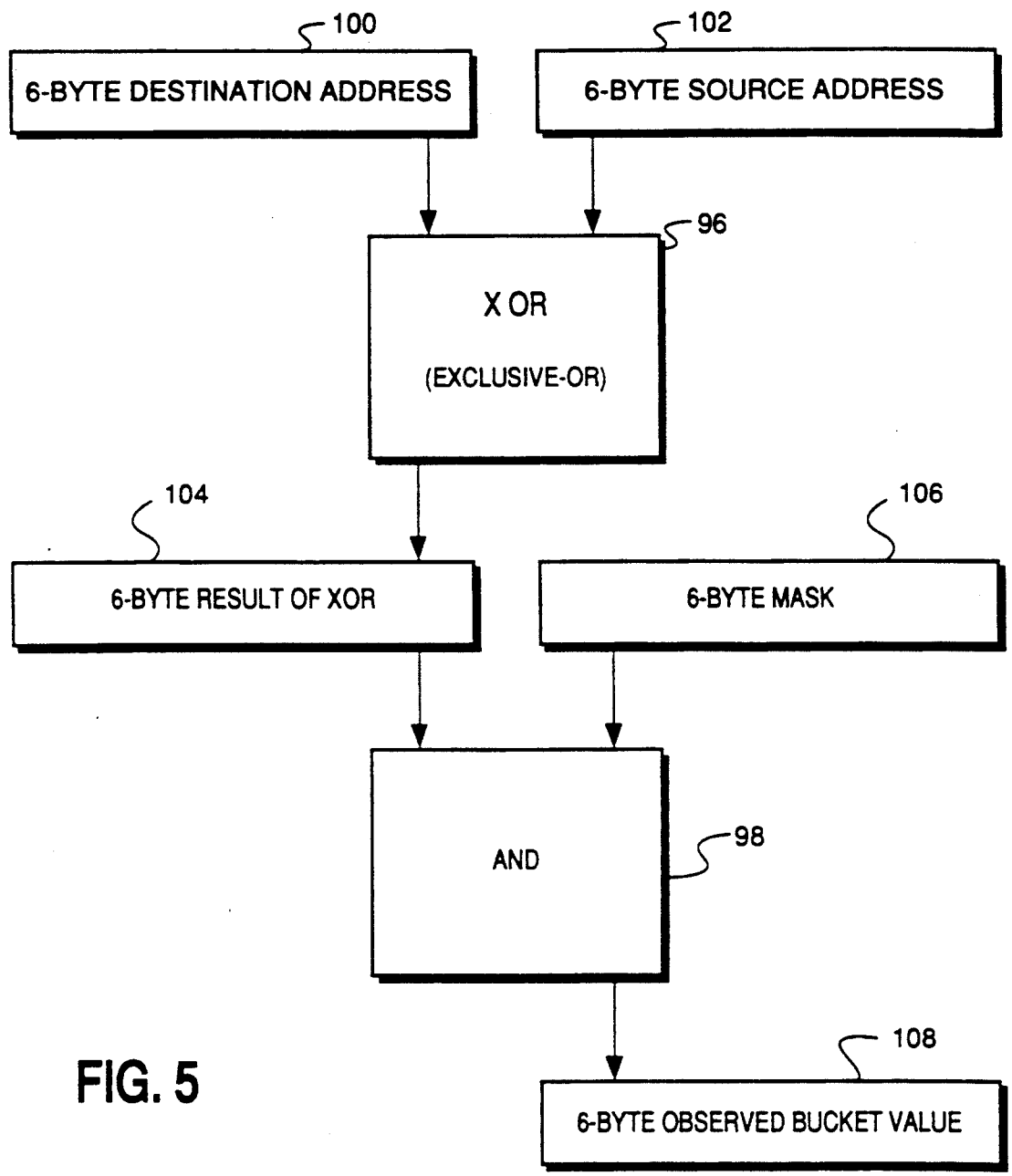
FIG. 5 is a block diagram of an observed bucket value computation.

Referring to FIG. 5, two binary functions are performed on the two addresses: an Exclusive-OR (i.e., XOR) function 96 and an AND function 98. Specifically, the 6-byte destination address 100 is XORed with the 6-byte source address 102, and the 6-byte result 104 of this XOR operation is ANDed with a 6-byte mask 106. The 6-byte result 108 of this AND operation is the observed bucket value 108 of the packet.

Figure 6:
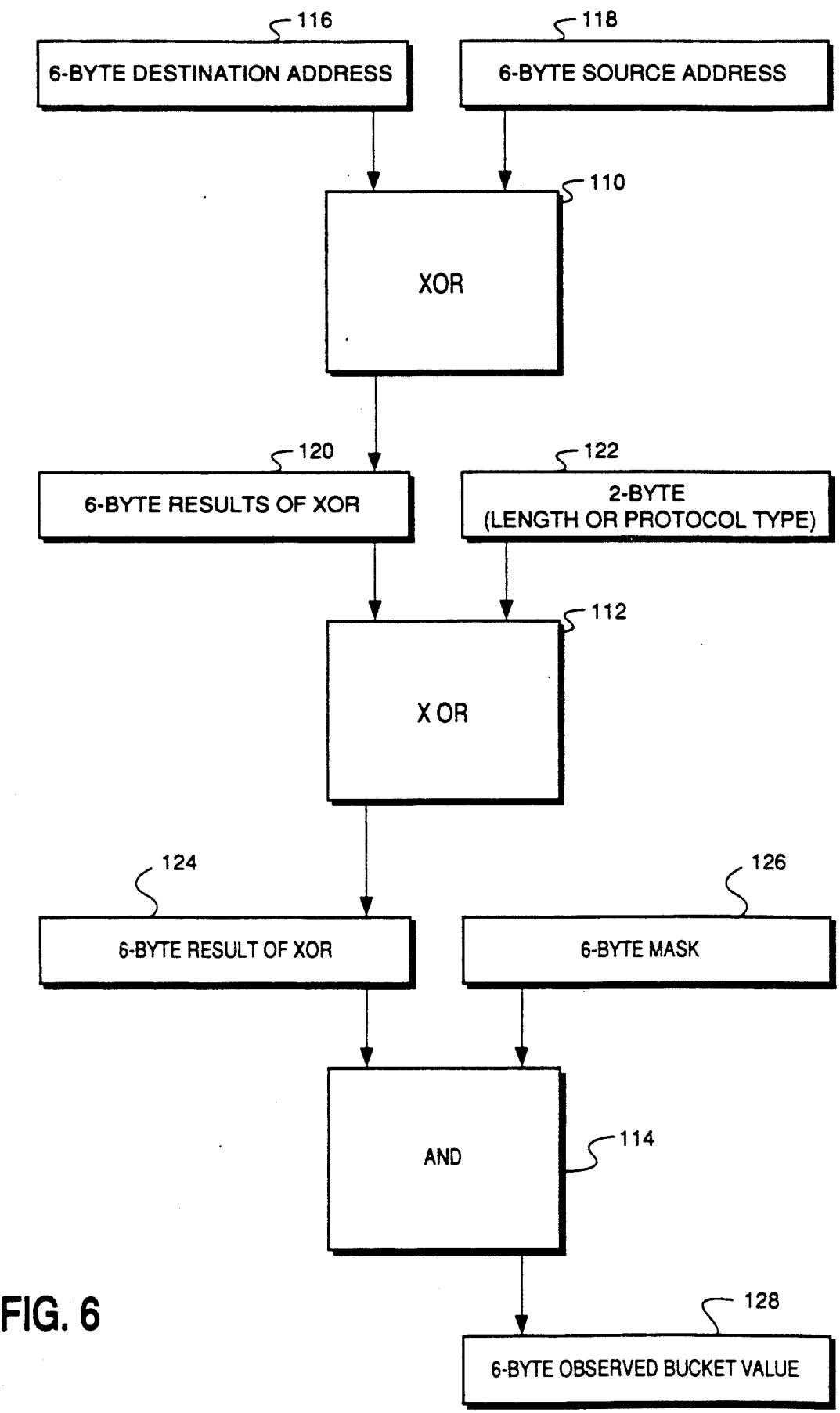
FIG. 6 is a block diagram of an alternate observed bucket value computation.

The last 2-byte (i.e., 16-bit) segment of each information packet that is unused in the computation of FIG. 5 may be used in an alternate observed bucket value computation. Referring to FIG. 6, the alternate computation involves three binary functions: two Exclusive-OR (i.e., XOR) functions 110, 112 and an AND function 114. Specifically, the 6-byte destination address 116 is XORed with the 6-byte source address 118, the 6-byte result 120 is XORed with the 2-byte segment 122, and the 6-byte result 124 is ANDed with a 6-byte mask 126. The 6-byte final result 128 is the observed bucket value 128 of the packet. The 2-byte segment 122 is "padded" with zeroes in the most significant 4 bytes so that it is properly aligned with the lowest two bytes of the 6-byte result 120 during the XOR computation 112.

It is possible to use functions other than the XOR functions 96, 110 in computing observed bucket values (FIGS. 5 and 6). An advantage of the XOR function is the commutative property. In other words, the order in which the values are XORed is unimportant to the ultimate result. Any function that has such a property could be used in place of XOR functions 96, 110 (i.e., in place of the functions that operate on the 6-byte destination and source addresses 100, 102, 116, 118). In contrast, XOR function 112 (FIG. 6) can be any equivalent function even if it is non-commutative.

In this example, the 6-byte mask (106, FIG. 5 and 126, FIG. 6) has a decimal value of 31, i.e., the five least significant bits in the 6-byte mask are ones, and the remaining bits are zeroes. Because the mask has a decimal value of 31, the observed bucket values may range from 0 to 31. However, a mask value as high as $2^{48-1}$ (in decimal) may also be used. In this case, observed bucket values would range from 0 to $2^{48-1}$. A decimal mask value of $2^{48-1}$ means all 48 bits in the 6-byte mask are ones.

If there are fewer bridge pairs than unique bucket values in the parallel topology, topology recognition/traffic assignment module 62 in the master bridge assigns more than one unique bucket value to some or all bridge pairs until all possible bucket values have been assigned. In the present example, the master bridge only assigns 32 unique bucket values so 32 bridge pairs can be supported in the parallel topology. However, more bridge pairs may be supported in the parallel topology by having the master bridge assign more (such as up to $2^{48}$) unique bucket values.

Topology recognition/traffic assignment module 62 in the master bridge preferably assigns bucket values to bridge pairs in inverse proportion to the cost of the links between the bridge pairs. For instance, if the parallel topology consists of only two bridge pairs and a link associated with the first bridge pair has twice the cost of a link associated with the second bridge pair, the master bridge preferably assigns half as many bucket values to the first bridge pair link as to the second bridge pair link.

In brief summary, topology recognition/traffic assignment module 62 in the master bridge and forwarding/filtering module 58 in the other bridges control information packet traffic. The master bridge assigns one or more bucket values to each bridge pair in the parallel topology. The bridges compute an observed bucket value for each information packet they receive from the LAN to which they are connected and compare this observed bucket value with their assigned bucket values (i.e., the bucket values assigned to them by the master bridge). If the observed and the assigned bucket values match, the information packet is forwarded over the link to the bridge partner on the other LAN. However, if the observed and the assigned bucket values do not match, the information packet is not forwarded.

The parallel topology then assumes a static state, and the bridge pairs in the parallel topology continue to forward information packets from one LAN to another. While in this static state, all bridges in the parallel topology continue periodic communication with each other.

If a change occurs in the parallel topology, all bridges sense the change because of the continual and periodic communication. A change may include a bridge failing, a new bridge coming on-line, a link failing, or a link cost changing in the parallel topology. After sensing such a change, all bridges in the parallel topology halt operation and stop forwarding information packets. All bridges then effectively reset and repeat the process described above beginning with the LAN identifier module determining a unique LAN identifier for each LAN.

As indicated above, a feature of the invention is that operation of the parallel bridge topology may be in total conformity to the IEEE 802.1d protocol. For instance, if a link outside the parallel topology has a lower cost than the effective link cost announced by the master bridge and conformity with the IEEE 802.1d protocol chooses this lower cost link and blocks the link between the master bridge and its bridge partner, the master bridge then instructs all bridges in the parallel topology to halt operation and stop forwarding information packets. The master bridge may continue to announce the effective link cost in conformity with the IEEE 802.1d protocol for possible selection again.

As described above, the master bridge is in constant communication with the other bridges in the parallel topology. The bridge pairs in the parallel topology preferably determine an average utilization of the link connecting them by keeping and manipulating information about the information packet traffic on the link. This constant communication allows the bridge pairs to inform the master bridge of the average utilization of their links. If the master bridge finds the link utilization of any bridge to be unacceptable, the master bridge may preferably reassign the assigned bucket values. If the master bridge determines, based on actual observed information packet traffic between bridge pairs, that assigned bucket values should be reassigned to achieve more balanced traffic loads across each bridge pair, the master bridge will instruct all bridges in the parallel topology to halt operation and stop forwarding information packets. The master bridge will then repeat the process described above beginning with topology recognition/traffic assignment module 62 in the master bridge assigning information packets to certain bridge pairs in the parallel topology.

Having described the physical arrangement and the mode of operation of a system according to the invention, the specific format of messages used in a system according to the invention will now be described.

In one exemplary embodiment, all transmitted messages use the Ethernet II message packet format. An Ethernet II message packet includes a packet header and a portion containing the actual message. The packet header contains 14 octets (where an octet is an 8-bit byte), and the actual message portion of the message packet may contain between 0 and 1500 octets. An Ethernet II message packet must consist of at least sixty-four octets.

Unless otherwise stated, all multi-octet fields within the Ethernet II message packet are transmitted by sending the high-order octet first. All single-octet fields within the message packet are transmitted in order from "top to bottom", as top and bottom is indicated in FIGS. 8 through 14.

Referring to FIG. 7, the 14-byte packet header of an Ethernet II message packet includes fourteen octets numbered zero (least significant byte) to thirteen (most significant byte). The first six octets (i.e., octets 0 through 5) contain a destination address 130, and the next six octets (i.e., octets 6 through 11) contain a source address 132. A 2-byte (i.e., two-octet) protocol type field 134 (octets 12 and 13) is set to hexadecimal 088A. Octet 12 contains hexadecimal 08, and octet 13 contains hexadecimal 8A.

The invention uses two single-octet fields which immediately follow octet 13 of the packet header. These two fields are technically part of the actual message portion of the message packet, but, for simplicity, they may be considered octets 14 and 15 of the packet header, as indicated in FIG. 7. Octet 14 is a pad count field 136 which contains a non-zero value when the information to be transmitted in a single message packet requires less than sixty-four octets. When the information to be transmitted can be contained in less than sixty-four octets, the value in the pad count field 136 represents the number of zero-value octets that have been added to the message packet as "padding" to bring the total number of octets in the message packet to sixty-four. Octet 15 is a single-byte LAN identifier field 138 which is set to either the value 4 (hexidecimal or decimal) to indicate that the LAN identifier message (described previously) is contained in the actual message portion of the message packet to be transmitted, or the value 5 (hexidecimal or decimal) to indicate that a message other than the LAN identifier message is forthcoming in the actual message portion.

The LAN identifier message, as described previously, is sent by a bridge over its LAN link or links in order to determine the LAN identifier for the LAN to which the bridge is connected. Referring to FIG. 9, the LAN identifier message includes four fields. The first field is a one-octet (i.e., one 8-bit byte) TYPE field which identifies the message type, and is simply set to a default value of 1 in this embodiment. The second field is a one-octet VERSION field which identifies the version number of the system, and is simply set to a default value of 0 in this embodiment. The third field is an eight-octet (i.e., 8-byte) LAN-ID field which contains the LAN identifier of the LAN to which the sending bridge is connected. The fourth field is a one-octet STABLE-FLAG field which indicates whether the sending bridge believes the LAN identifier is stable (value 1) or not (value 0).

A "LAN master/slave" message is sent by the master bridge (e.g., $B_{20}$, FIG. 1) of a parallel group of bridges over its LAN link or links (e.g., 55, FIG. 1), and by the master bridge's slave partner (e.g., $B_{21}$, FIG. 1) over its LAN link or links (e.g., 57, FIG. 1). Referring to FIG. 10, the LAN master/slave message includes eight fields. The first field is a one-octet TYPE field which contains the value 1 (the default value) to indicate that the master bridge is sending, or the value 3 to indicate that the master bridge's partner is sending. The second field is a one-octet VERSION field which identifies the version number of the system, and is simply set to a default value of 0. The third and fourth field are a two-octet CONFIG field and a one-octet STP-STATE field, respectively, which are both described below with reference to FIG. 8. The fifth is a one-octet GROUP-SIZE field which identifies the number of "records" contained in a GROUPS field (described below). The sixth is an eight-octet REMOTE-LAN-ID field which contains the LAN identifier of the sending bridge's partner's LAN. The seventh is an eight-octet GROUP-MASTER-ID field which contains what the sending bridge believes to be the master bridge's spanning tree bridge identifier (described previously). The eighth field is the GROUPS field which contains GROUP-SIZE "records".

Referring to FIG. 11, each of the GROUP-SIZE "records" in the GROUPS field includes eight defined fields and two undefined fields. The first defined field is an eight-octet NEIGHBOR-ID field containing a neighboring bridge's spanning tree bridge identifier, where a neighbor bridge is equivalent to a peer bridge described previously. The second defined field is a one-octet NEIGHBOR-STATE field which contains a neighboring bridge's state (see description of STATE field below with reference to FIG. 8). The third defined field is a four-octet NEIGHBOR-PATH-COST field which contains a neighboring bridge's spanning tree path cost associated with the WAN link between the neighbor and its partner bridge. The fourth defined field is a four-octet NEIGHBOR-BUCKETS field containing a bit map of bucket value(s) assigned to a neighboring bridge. The fifth is an eight-octet PARTNER-ID field containing the spanning tree bridge identifier of a neighboring bridge's partner bridge. The sixth is a one-octet PARTNER-STATE field which contains a neighboring bridge's partner's state (see description of STATE field below with reference to FIG. 8). The seventh defined field is a four-octet PARTNER-PATH-COST field containing a neighboring bridge's partner's spanning tree path cost associated with the WAN link between the neighboring bridge and its partner. The eighth is a four-octet PARTNER-BUCKETS field containing a bit map of bucket value(s) assigned to a neighboring bridge's partner.

Referring to FIG. 8, the two-octet CONFIG, one-octet STP-STATE, and one-octet STATE fields mentioned above are now described. The CONFIG field contains a bit map of the configuration of the sending bridge, and is generally a description of the capabilities of the transmitting system. Three bit configurations for the CONFIG field are possible. If neither bit 0 nor bit 1 are set, all bridging is totally disabled. If bit 0 is set and bit 1 is not set, normal bridging is enabled. If both bit 0 and bit 1 are set, parallel bridging according to the invention is enabled. The STP-STATE field generally contains the spanning tree state of the transmitting system, and more specifically it contains the spanning tree port state which all bridges in the parallel group should take for all of their WAN links. A value of 0 in the STP-STATE field means the spanning tree port is blocked, a value of 1 means the spanning tree port is listening, a value of 2 means learning, and a value of 3 indicates forwarding of messages. The STATE field indicates the state of the transmitting system, and is referred to as NEIGHBOR-STATE (see above), PARTNER-STATE (see above), and SELF-STATE (see below). The STATE field (in any of its three forms) contains any one of the values 1, 2, 3, 4, 5, 6, 8, 10, 11, 13, 14, or 15 which indicate, respectively, bad topology, disabled, same LAN, not stable, local LAN stable, remote LAN stable, slave bridge, peer bridge waiting, peer bridge, master bridge waiting, master bridge, or master bridge stopped.

A "LAN peer" message is sent by a peer bridge (e.g., $B_{10}$, FIG. 1) of the master bridge (e.g., $B_{20}$, FIG. 1) over the LAN shared by the peer and the master (e.g., 50, FIG. 1). Referring to FIG. 12, the LAN peer message includes twelve defined fields and two undefined fields. The first defined field is a one-octet TYPE field which contains a default value of 2, in this embodiment. The second defined field is a one-octet VERSION field which identifies the version number of the system, and is simply set to a default value of 0. The third field is a two-octet CONFIG field, as described previously with reference to FIG. 8. The fourth defined field is an eight-octet REMOTE-LAN-ID field which contains the LAN identifier of a parallel group's remote LAN. The fifth is an eight-octet SELF-ID field containing the sending bridge's spanning tree bridge identifier. The sixth is a one-octet SELF-STATE field which identifies the sending bridge's state, as state has been defined with reference to FIG. 8. The seventh defined field is a four-octet SELF-PATH-COST field which contains the sending bridge's spanning tree path cost associated with the peer bridge's WAN link. The eighth is a four-octet SELF-BUCKETS field containing a bit map of the bucket value(s) assigned to the sending bridge. The ninth is an eight-octet PARTNER-ID field containing the sending bridge's partner's spanning tree bridge identifier. The tenth is a one-octet PARTNER-STATE field containing the sending bridge's partner's state, as state has been described with reference to FIG. 8. The eleventh defined field is a four-octet PARTNER-PATH-COST field containing the sending bridge's partner's spanning tree path cost associated with the WAN link connecting the sending bridge's partner to the sending bridge. The twelfth is a four-octet PARTNER-BUCKETS field containing a bit map of the bucket value(s) assigned to the sending bridge's partner.

In the case of remote LANs (e.g., FIG. 1), a "WAN" message is sent by each bridge in the parallel group to its bridge partner over the WAN link (e.g., $B_{10}$ to $B_{11}$, FIG. 1). Referring to FIG. 13, the WAN message includes thirteen defined fields and one undefined field. The first defined field is a one-octet TYPE field which contains the value 4, 5, 6, or 7 to identify the message as originating from, respectively, a master bridge (message in long format), a master bridge (message not in long format), a peer bridge, or a slave bridge. The second defined field is a one-octet VERSION field containing a default value of 0. The third and fourth fields are the two-octet CONFIG and one-octet STP-STATE fields which have been described previously. The fifth defined field is a one-octet GROUP-SIZE field identifying the number of "records" in a GROUPS field (described below) and containing the value 0 except when the TYPE field contains the value 4. The sixth is a four-octet COMBINED-PATH-COST field which indicates either the average spanning tree path cost associated with the WAN link as seen by the sending bridge and its slave bridge when the message is sent by a master or a peer bridge, or the last value received in this field from the slave bridge's partner when the message is sent by a slave bridge. The seventh defined field is an eight-octet LOCAL-LAN-ID field containing the LAN identifier of the sending bridge's LAN. The eighth is an eight-octet GROUP-MASTER-ID field containing what the sending bridge believes to be the spanning tree bridge identifier of the master bridge. The ninth is an eight-octet SELF-ID field containing the sending bridge's spanning tree bridge identifier. The tenth defined field is a one-octet SELF-STATE field containing the sending bridge's state, as state has been described with reference to FIG. 8. The eleventh is a four-octet SELF-PATH-COST field which contains the sending bridge's spanning tree path cost associated with the WAN link on which this message is sent. The twelfth is a four-octet SELF-BUCKETS field containing a bit map of the bucket value(s) assigned to the sending bridge. The thirteenth defined field is the GROUPS field which contains GROUP-SIZE "records". The value of GROUP-SIZE is 0 (i.e., the GROUPS field contains nothing) unless the TYPE field contains the value 4 (i.e., unless the TYPE field indicates the message as a "master—long format" type).

Referring to FIG. 14, each of the GROUP-SIZE "records" in the GROUPS field includes eight defined fields and two undefined fields. The possible contents of the eight defined fields and their meaning are the same as for the eight defined fields described previously with reference to FIG. 11.

Software may be used to implement the system described above. An example of computer source code which implements the system is set forth in Appendix A. The code in Appendix A is written in the C programming language. Appendix A is subject to copyright protection. The copyright owner has no objection to the reproduction of Appendix A as it appears in the United States Patent and Trademark Office, but otherwise reserves all copyright rights whatsoever.

APPENDIX A

```
/*@(#)brpara.h  1.13*/
#ifndef brpara_H
#define brpara_H

/[DOC]********************************************************
*****************************************************************
***     (c) Copyright 1990, Xyplex, Inc. All Rights Reserved.
***
***     crpara.h: header file for Parallel Bridge routines
***
***     typedefs:
***
***     origination: new
*****************************************************************
*[END_DOC]***************************************************/ ifndef xyplex_H
include "xyplex.h"
endif ifndef xyplex_BBA_H
include "xyplex_BBA.h"
#endif
```

```
#ifndef stp_H
#include "stp.h"
#endif

/*******************************
********************************
********    LITERALS    ********
********************************
*******************************/ define SPPARA_STATE_INIT                 0
define SPPARA_STATE_BAD_TOPOLOGY         1
#define SPPARA_STATE_OPERATER_DISABLE     2
#define SPPARA_STATE_SAME_LAN             3
#define SPPARA_STATE_NO_STABLE            4
#define SPPARA_STATE_LOCAL_STABLE         5
#define SPPARA_STATE_REMOTE_STABLE        6
#define SPPARA_STATE_BOTH_STABLE          7
#define SPPARA_STATE_SLAVE                8
#define SPPARA_STATE_NOT_MASTER_INIT      9
#define SPPARA_STATE_NOT_MASTER_WAIT      10
#define SPPARA_STATE_NOT_MASTER           11
#define SPPARA_STATE_MASTER_INIT          12
#define SPPARA_STATE_MASTER_WAIT          13
#define SPPARA_STATE_MASTER               14
#define SPPARA_STATE_MASTER_STOP          15

/* lan state literals */
#define SPPARA_LAN_STABLE                 1
#define SPPARA_LAN_UNSTABLE               2
#define SPPARA_TIMEOUT                    100 /* one second */
#define SPPARA_TIMER_INACTIVE             ((UTINY) -1)
/* timeouts (in seconds) */
#define SPPARA_SHORT_TRANSMIT_TIMEOUT     2
#define SPPARA_LONG_TRANSMIT_TIMEOUT      5
#define SPPARA_NEIGHBOR_TIMEOUT           16
#define SPPARA_MASTER_TIMEOUT             16
#define SPPARA_MASTER_LONG_TIMEOUT        5
#define SPPARA_PARTNER_TIMEOUT            16
#define SPPARA_TRANSMIT_STABLE_COUNT      10
#define SPPARA_LOCAL_TRANSMIT_COUNT       5    /* 5 transmits in a row before wait */
#define SPPARA_LOCAL_TRANSMIT_SHORT       1    /* one interval 2 seconds */
#define SPPARA_LOCAL_TRANSMIT_LONG        1800 /* 60 minutes */

/* parallel bridge packet types */
#define SPPARA_MSG_FIRST                  0
#define SPPARA_MSG_MASTER                 1
#define SPPARA_MSG_NON_MASTER             2
#define SPPARA_MSG_SLAVE                  3
#define SPPARA_MSG_WAN_MASTER_LONG        4
#define SPPARA_MSG_WAN_MASTER             5
#define SPPARA_MSG_WAN_NON_MASTER         6
#define SPPARA_MSG_WAN_SLAVE              7
define SPPARA_MSG_LAST                   8 define SPPARA_MSG_VERSION                1 define SPPARA_BUCKETS                    32

/* parallel bridge message flags */
#define SPPARA_MSG_FLAG_FORWARD           (1 << 0)

/* parallel bridge capability flags */
#define SPPARA_CONFIG_BRIDGE              (1 << 0)
#define SPPARA_CONFIG_BRIDGE_PARALLEL     (1 << 1)
#define SPPARA_CONFIG_IP                  (1 << 2)
#define SPPARA_CONFIG_IP_PARALLEL         (1 << 3)
#define SPPARA_CONFIG_OSPF                (1 << 4)
#define SPPARA_CONFIG_IPX                 (1 << 5)
#define SPPARA_CONFIG_IPX_PARALLEL        (1 << 6)

/*******************************
********************************
********   STRUCTURES   ********
********************************
*******************************/ typedef struct
{
    STP_IDENTIFIER    id;
```

```
    UTINY           state;
    UTIN;           timer;           /* used differently for neighbor vs partner */
    UTIN;           fill[2];
    ULONG           pathCost;
    ULONG           buckets;
} BRPARA_BRIDGE_STR;

typedef struct
{
    BRPARA_BRIDGE_STR    neighbor;
    BRPARA_BRIDGE_STR    partner;
} BRPARA_GROUP_STR;

typedef struct
{
    TBITS           stpState;
    UTINY           groupSize;       /* never greater than buckets */
    STP_IDENTIFIER  remoteLanId;
    STP_IDENTIFIER  groupMasterId;
#if !MICROTEC
    BRPARA_GROUP_STR    groups[0];
#endif
} BRPARA_MASTER_MSG_STR;

typedef struct
{
    STP_IDENTIFIER   remoteLanId;
    BRPARA_GROUP_STR self;
} BRPARA_NON_MASTER_MSG_STR;

typedef struct
{
    TBITS           stpState;
    UTINY           groupSize;       /* never greater than buckets */
    ULONG           pairPathCost;
    STP_IDENTIFIER  localLanId;
    STP_IDENTIFIER  groupMasterId;
    BRPARA_BRIDGE_STR   self;
#if !MICROTEC
    BRPARA_GROUP_STR    groups[0];
#endif
} BRPARA_WAN_MSG_STR;

typedef struct
{
    XYPLEX_SBA_HDR_STR   hdr;
    UTINY                type;
    UTINY                version;
    UCOUNT               config;
} BRPARA_MSG_HDR_STR;

typedef struct
{
    BRPARA_MSG_HDR_STR              hdr;
    union {
        BRPARA_MASTER_MSG_STR       master;
        BRPARA_NON_MASTER_MSG_STR   nonMaster;
        BRPARA_WAN_MSG_STR          wan;
    } msg;
} BRPARA_MSG_STR;

/*******************************************
 *******************************************
 ***       GLOBAL VARIABLES              ***
 *******************************************
 *******************************************/

IMPORT  LINX_BIT_MAP    brParaStpOutMask;
IMPORT  LINX_BIT_MAP    brParaStpLocalOutMask;

/*******************************************
 *******************************************
 ***   PRIVATE FUNCTION PROTOTYPES       ***
 *******************************************
 *******************************************/ if ANSI_C
else
IMPORT VOID BrParaProcess();
IMPORT VOID BrParaReceive();
```

```
IMPORT VOID BrParaLanStable();
IMPORT VOID BrParaNewWanState();
IMPORT VOID BrParaStateMachine();
endif /***************************************
 ****************************************
 ***   PUBLIC FUNCTION PROTOTYPES   ***
 ****************************************
 ***************************************/ if ANSI_C
else
endif endif
```

BEST AVAILABLE COPY

```
        sss
       s   s       hhh          sss
       s           h  h        s   s
        sss        h  h         sss
           s       h  h            s
       s   s       h  h        s   s
        sss                     sss
```

```
 11
  1                                                              h                 ff
  1                                                              h                f  f
  1                                                              h                 f
  1    aaaa   n nnn    n nnn    aaaa   m m m   eeee    h hhh    ffff    m m m    t
  1   a    a  nn   n   nn   n  a    a  m m m  e    e   hh   h    f      m m m
  1   aaaaaa  n    n   n    n  aaaaaa  m m m  eeeee    h    h    f      m m m
  1   a    a  n    n   n    n  a    a  m m m  e        h    h    f      m m m
 111   aaaa   n    n   n    n   aaaa   m m m   eeee    h    h    f      m m m
```

```
        sss        hhh          sss
       s   s       h  h        s   s
        sss        h  h         sss
           s       h  h            s
       s   s       h  h        s   s
        sss                     sss
```

```
/*@(#)lanname.h 1.7*/
#ifndef lanname_H
#define lanname_H

/[DOC]********************************************************************
 *****************************************************************************
 ***     (C) Copyright 1990, Xyplex, Inc.  All Rights Reserved.
 ***
 ***     lanname.h: header file for LAN naming routine
 ***
 ***     typedefs:
 ***
 ***     origination: new
 *****************************************************************************
 *[END_DOC]**************************************************************/

/*******************************************
 ********************************************
 ********     LITERALS     *********
 ********************************************
 *******************************************/ define LANNAME_STATE_INIT              0
define LANNAME_STATE_OPERATER_DISABLE  1
```

```c
#define LANNAME_STATE_MASTER_UNSTABLE       2
#define LANNAME_STATE_MASTER_STABLE         3
#define LANNAME_STATE_SLAVE_UNSTABLE        4
define LANNAME_STATE_SLAVE_STABLE          5 define LANNAME_TIMEOUT                     100 /* one second */
define LANNAME_TIMER_INACTIVE              ((UTINY) -1)
/* timeouts (in seconds) */
#define LANNAME_SHORT_MULTICAST_TIMEOUT     2
#define LANNAME_LONG_MULTICAST_TIMEOUT      5
#define LANNAME_SYNCH_TIMEOUT               10
#define LANNAME_MASTER_TIMEOUT              16

/* lan packet types */
define LANNAME_MSG_SYNCH                   1 define LANNAME_MSG_VERSION                 0 define LANNAME_MAX_ATTACHES                3

/***********************************
 ***********************************
 ********   STRUCTURES   ***********
 ***********************************
 ***********************************/ typedef struct
{
    XYPLEX_SBA_HDR_STR   hdr;
    UTINY                type;
    UTINY                version;
    STP_IDENTIFIER       lanId;
    UTINY                stableFlag;
    UTINY                fill;
} LANNAME_MSG_STR;

typedef struct
{
    VOID    (*service_routine)();
} LANNAME_ATTACH_STR;

/***********************************
 ***********************************
 *** PRIVATE FUNCTION PROTOTYPES ***
 ***********************************
 ***********************************/ if ANSI_C
else
GLOBAL VOID     LanNameProcess();
GLOBAL VOID     LanNameReceive();
endif /***********************************
 ***********************************
 *** PUBLIC FUNCTION PROTOTYPES  ***
 ***********************************
 ***********************************/ if ANSI_C
else
IMPORT BOOLEAN  LanNamePoll();
IMPORT VOID     LanNameAttach();
endif endif
```

BEST AVAILABLE COPY sns lanname.c.fmt sns

```c
/*@(#)lanname.c 1.17*/
#include "xyplex.h"
#include "target.h"
#include "config.h"
#include "crash.h"
#include "process.h"
#include "timer.h"
#include "nlink.h"
#include "lat.h"
#include "packet.h"
#include "xyplex_88A.h"
#include "priority.h"
#include "wan.h"
#include "stp.h"
#include "link.h"
#include "filter.h"
#include "bridge.h"
#include "lanname.h"

#ifndef interface_H
include "interface.h"
#endif

GLOBAL LANNAME_ATTACH_STR   lanNameAttachTable[ LANNAME_MAX_ATTACHES ];

#if DEBUG
GLOBAL BOOLEAN  lanNameDebug = FALSE;
#endif

IMPORT ULONG            elapsed_time;

LanNameInit()
{
    FAST COUNT          i;
    FAST LINK_DATA_STR  *lpoint;

for ( i = 0; i < LANNAME_MAX_ATTACHES; i++ )
        lanNameAttachTable[ i ].service_routine = NULL;

for ( i = base_lan; i < base_lan + ci.max_lan; i++ )
    {
        lpoint = link_table_ptrs[ i ];
        if ( (lpoint->link.lan.lanNamePcb = process_create( 1, LanNameProcess,
            0, lpoint, "lanname" )) == NULL )
        crash( CRASH_LANNAME_CANT_INIT );
```

```
    if ( (lpoint->link.lan.lanNameTimer =
        timer_alloc( lpoint->link.lan.lanNamePcb )) == NULL )
        crash( CRASH_LANNAME_CANT_INIT );

que_init( &lpoint->link.lan.lanNameQue );

lpoint->link.lan.lanNameStateCur = LANNAME_STATE_INIT;
    lpoint->link.lan.lanNameStateNew = LANNAME_STATE_MASTER_UNSTABLE;
    }
    xyplx_BBA_attach( XYPLEX_BBA_LAN, LanNameReceive );
} if DEBUG
IMPORT UTINY    clock_ticks;

LOCAL VOID do_dtm()
{
    TEXT    buf[32];

clock_dat2txt( clock_getdate(), &buf[0] );
    buf[11] = ' ';
    buf[12] = ' ';
    clock_tim2txt( clock_gettime(), &buf[13] );
    sprintf( &buf[21],".%02u", clock_ticks );
    buf[24] = ' ';
    buf[25] = ' ';
    buf[26] = '\0';
    debug_printstr( buf );
}
endif GLOBAL VOID
LanNameAttach( service_routine )
    FAST VOID   (*service_routine)();
{
    FAST UCOUNT i;

for ( i = 0; i < LANNAME_MAX_ATTACHES; i++ )
    {
        if ( lanNameAttachTable[ i ].service_routine == NULL )
        {
            lanNameAttachTable[ i ].service_routine = service_routine;
            return;
        }
    } crash( CRASH_LANNAME_ATTACH_TABLE_FULL );
}

GLOBAL VOID
LanNameNotify( lpoint )
    FAST LINK_DATA_STR  *lpoint;
{
    FAST UCOUNT     i;

#if DEBUG
    if ( lanNameDebug )
    {
        do_dtm();
        dprintf( "Notifying for link %04X\n", lpoint );
    }
endif for ( i = 0; i < LANNAME_MAX_ATTACHES; i++ )
    {
        if ( lanNameAttachTable[ i ].service_routine != NULL )
            (*lanNameAttachTable[ i ].service_routine)( lpoint->intf );
    }
}

GLOBAL BOOLEAN
LanNamePoll( lpoint )
    FAST LINK_DATA_STR  *lpoint;
{
    if ( lpoint->link.lan.lanNameStateCur == LANNAME_STATE_MASTER_STABLE ||
         lpoint->link.lan.lanNameStateCur == LANNAME_STATE_SLAVE_STABLE )
        return( TRUE );
    else
        return( FALSE );
```

```
}

GLOBAL VOID
LanNameReceive( packet )
    FAST PACKET_STR         *packet;
{
    FAST LANNAME_MSG_STR    *msg;
    FAST LINK_DATA_STR      *lpoint;

if ( bridge_data.work.parallel != BRIDGE_PARALLEL_AUTO )
    {
        packet_free( packet );
        return;
    } msg = (LANNAME_MSG_STR *)packet->ptr;

if ( msg->version != LANNAME_MSG_VERSION ||
         msg->type != LANNAME_MSG_SYNCH )
    {
        packet_free( packet );
        return;
    } lpoint = intfTblPtrs[ packet->receiveIntf ]->link;

if ( lpoint->link.lan.lanNameQue.prev != &lpoint->link.lan.lanNameQue )
    {
        packet_free( packet );
        return;
    } que_install( &lpoint->link.lan.lanNameQue, packet );
    process_signal( lpoint->link.lan.lanNamePcb, SIG_RECEIVE );
    return;
}

GLOBAL VOID
LanNameSend( lpoint, addr )
    FAST LINK_DATA_STR      *lpoint;
    FAST NLINK_ADDR_STR     *addr;
{
    FAST PACKET_STR         *packet;
    FAST LANNAME_MSG_STR    *msg;

if ( (packet = packet_alloc()) == NULL )
        return;

msg = (LANNAME_MSG_STR *) packet->ptr;

msg->hdr.pad_count = 0;
    msg->hdr.type = XYPLEX_SBA_LAN;
    msg->type = LANNAME_MSG_SYNCH;
    msg->version = LANNAME_MSG_VERSION;
    stp_id_cpy( &msg->lanId, &lpoint->link.lan.lanNameLinkId );
    msg->stableFlag = (lpoint->link.lan.lanNameStateCur == LANNAME_STATE_MASTER_STABLE);
    msg->will = 0;

packet->count = sizeof( *msg );
    packet->send_mask = 1 << lpoint->assigned_link;

if ( addr == NULL )
        addr = reserved_multicast;

#if DEBUG
    if ( lanNameDebug )
    {
        sp_ctm();
        sp_printf( "Sending packet for link %04X\n", lpoint );
    }
endif
    nlink_addr_cpy( &msg->hdr.ethernet.dest_addr, addr );
    nlink_addr_cpy( &msg->hdr.ethernet.source_addr, &lpoint->link_address );
    msg->hdr.ethernet.protocol = XYPLEX_SBA_PROTOCOL_TYPE;

forward_receive( packet );
}

GLOBAL VOID
LanNameWriteMaster( lpoint, stp_id )
```

```
        FAST LINK_DATA_STR      *lpoint;
        FAST STP_IDENTIFIER     *stp_id;
{ if DEBUG
    if ( lanNameDebug )
    {
        co_dtm();
        cprintf( "Worse Master packet for link %04X\n", lpoint );
    }
endif switch( lpoint->link.lan.lanNameStateCur )
    {
        case LANNAME_STATE_MASTER_UNSTABLE:
            /* reset the stability timer */
            lpoint->link.lan.lanNameSynchMasterTimer = 0;

case LANNAME_STATE_MASTER_STABLE:
            LanNameSend( lpoint, &stp_id->id );
            break;

case LANNAME_STATE_SLAVE_UNSTABLE:
        case LANNAME_STATE_SLAVE_STABLE:
        case LANNAME_STATE_OPERATER_DISABLE:
            break;

default:
            crash( CRASH_LANNAME_BAD_STATE );
            break;
    }
}

GLOBAL VOID
LanNameBetterMaster( lpoint, stp_id, stable )
    FAST LINK_DATA_STR      *lpoint;
    FAST STP_IDENTIFIER     *stp_id;
    FAST UTINY              stable;
{ if DEBUG
    if ( lanNameDebug )
    {
        co_dtm();
        cprintf( "Better Master packet for link %04X\n", lpoint );
    }
endif stp_id_cpy( &lpoint->link.lan.lanNameId, stp_id );

switch( lpoint->link.lan.lanNameStateCur )
    {
        case LANNAME_STATE_MASTER_UNSTABLE:
        case LANNAME_STATE_MASTER_STABLE:
            if ( stable )
                lpoint->link.lan.lanNameStateNew = LANNAME_STATE_SLAVE_STABLE;
            else
                lpoint->link.lan.lanNameStateNew = LANNAME_STATE_SLAVE_UNSTABLE;
            process_signal( lpoint->link.lan.lanNamePcb, SIG_WAKEUP );
            break;

case LANNAME_STATE_SLAVE_UNSTABLE:
            if ( stable )
            {
                lpoint->link.lan.lanNameStateNew = LANNAME_STATE_SLAVE_STABLE;
                process_signal( lpoint->link.lan.lanNamePcb, SIG_WAKEUP );
            }
            else
            {
                lpoint->link.lan.lanNameChanges++;
                lpoint->link.lan.lanNameStableTime = elapsed_time;
            }
            break;

case LANNAME_STATE_SLAVE_STABLE:
            if ( !stable )
            {
                lpoint->link.lan.lanNameStateNew = LANNAME_STATE_SLAVE_UNSTABLE;
                process_signal( lpoint->link.lan.lanNamePcb, SIG_WAKEUP );
            }
            else
```

```c
            {
                LanNameNotify( lpoint );
                lpoint->link.lan.lanNameChanges++;
                lpoint->link.lan.lanNameStableTime = elapsed_time;
            }
            break;

case LANNAME_STATE_OPERATER_DISABLE:
            break;

default:
            crash( CRASH_LANNAME_BAD_STATE );
            break;
    }
}

GLOBAL VOID
LanNameStableFlag( lpoint, stable )
    FAST LINK_DATA_STR      *lpoint;
    FAST LTINY              stable;
{ if DEBUG
    if ( lanNameDebug )
    {
        cc_atm();
        ccprintf( "Stable Flag packet for link %04X\n", lpoint );
    }
endif switch( lpoint->link.lan.lanNameStateCur )
    {
        case LANNAME_STATE_SLAVE_UNSTABLE:
            /* reset the master gone timer */
            lpoint->link.lan.lanNameSynchMasterTimer = 0;
            if ( stable )
            {
                lpoint->link.lan.lanNameStateNew = LANNAME_STATE_SLAVE_STABLE;
                process_signal( lpoint->link.lan.lanNamePcb, SIG_WAKEUP );
            }
            break;

case LANNAME_STATE_SLAVE_STABLE:
            /* reset the master gone timer */
            lpoint->link.lan.lanNameSynchMasterTimer = 0;
            if ( !stable )
            {
                lpoint->link.lan.lanNameStateNew = LANNAME_STATE_SLAVE_UNSTABLE;
                process_signal( lpoint->link.lan.lanNamePcb, SIG_WAKEUP );
            }
            break;

case LANNAME_STATE_OPERATER_DISABLE:
            break;

default:
            crash( CRASH_LANNAME_BAD_STATE );
            break;
    }
}

GLOBAL VOID
LanNameInput( lpoint )
    FAST LINK_DATA_STR      *lpoint;
{
    FAST PACKET_STR         *packet;
    FAST LANNAME_MSG_STR    *msg;
    FAST LONG               cmp;

while( (packet = (PACKET_STR *)que_remhead( &lpoint->link.lan.lanNameQue )) != NULL )
    {
        msg = (LANNAME_MSG_STR *) packet->ptr;

cmp = ntp_id_cmp( &msg->lanId, &lpoint->link.lan.lanNameId );
        if ( cmp == 1 )
        {
            /* if the master has lowered its priority */
            if ( nlink_addr_cmp( &msg->lanId.id, &lpoint->link.lan.lanNameId.id ) == 0 )
            {
```

```
#if DEBUG
            if ( lanNameDebug )
            {
                do_dtm();
                cprintf( "Master's Priority lowered for link %04X\n", lpoint );
            }
endif
            /* if id is worse than ours */
            if ( stp_id_cmp( &msg->lanId, &lpoint->link.lan.lanNameLinkId ) == 1 )
            {
                lpoint->link.lan.lanNameStateNew = LANNAME_STATE_MASTER_UNSTABLE;
                process_signal( lpoint->link.lan.lanNamePcb, SIG_WAKEUP );
            }
            else
            {
                stp_id_cpy( &lpoint->link.lan.lanNameId, &msg->lanId );
                if ( lpoint->link.lan.lanNameStateCur == LANNAME_STATE_SLAVE_STABLE )
                {
                    lpoint->link.lan.lanNameChanges++;
                    lpoint->link.lan.lanNameStableTime = elapsed_time;
                    LanNameNotify( lpoint );
                }
                LanNameStableFlag( lpoint, msg->stableFlag );
            }
        }
        else
            LanNameWorseMaster( lpoint, &msg->lanId );

else if ( cmp == -1 )
        LanNameBetterMaster( lpoint, &msg->lanId, msg->stableFlag );
    else
        LanNameStableFlag( lpoint, msg->stableFlag );

packet_free( packet );
    }
}

GLOBAL VOID
LanNameSynchMasterTimeout( lpoint )
    FAST LINK_DATA_STR  *lpoint;
{ if DEBUG
    if ( lanNameDebug )
    {
        do_dtm();
        cprintf( "Synch Master Timeout packet for link %04X\n", lpoint );
    }
endif switch( lpoint->link.lan.lanNameStateCur )
    {
        case LANNAME_STATE_MASTER_UNSTABLE:
            lpoint->link.lan.lanNameStateNew = LANNAME_STATE_MASTER_STABLE;
            process_signal( lpoint->link.lan.lanNamePcb, SIG_WAKEUP );
            break;

case LANNAME_STATE_SLAVE_UNSTABLE:
        case LANNAME_STATE_SLAVE_STABLE:
            lpoint->link.lan.lanNameStateNew = LANNAME_STATE_MASTER_UNSTABLE;
            process_signal( lpoint->link.lan.lanNamePcb, SIG_WAKEUP );
            break;

default:
            crash( CRASH_LANNAME_BAD_STATE );
    }
}

GLOBAL VOID
LanNameStateMachine( lpoint )
    FAST LINK_DATA_STR  *lpoint;
{
    FAST UTINY          stateLast;

while ( lpoint->link.lan.lanNameStateNew != lpoint->link.lan.lanNameStateCur )
    {
```

```
#if DEBUG
        if ( lanNameDebug )
        {
            do_dtm();
            dprintf( "New State %d Old State %d for link %04X\n",
                    lpoint->link.lan.lanNameStateNew, lpoint->link.lan.lanNameStateCur, lpoint );
        }
endif
        stateLast = lpoint->link.lan.lanNameStateCur;
        lpoint->link.lan.lanNameStateCur = lpoint->link.lan.lanNameStateNew;

switch( lpoint->link.lan.lanNameStateNew )
        {
            case LANNAME_STATE_OPERATER_DISABLE:
                stp_id_cpy( &lpoint->link.lan.lanNameId, &lpoint->link.lan.lanNameLinkId );
                lpoint->link.lan.lanNameMulticastTimer = LANNAME_TIMER_INACTIVE;
                lpoint->link.lan.lanNameSynchMasterTimer = LANNAME_TIMER_INACTIVE;
                break;

case LANNAME_STATE_MASTER_UNSTABLE:
                stp_id_cpy( &lpoint->link.lan.lanNameId, &lpoint->link.lan.lanNameLinkId );
                lpoint->link.lan.lanNameMulticastTimer = 0;
                lpoint->link.lan.lanNameMulticastTimeout = LANNAME_SHORT_MULTICAST_TIMEOUT;
                lpoint->link.lan.lanNameSynchMasterTimer = 0;
                lpoint->link.lan.lanNameSynchMasterTimeout = LANNAME_SYNCH_TIMEOUT;
                if ( stateLast != LANNAME_STATE_INIT )
                    LanNameSend( lpoint, NULL );
                break;

case LANNAME_STATE_MASTER_STABLE:
                lpoint->link.lan.lanNameMulticastTimeout = LANNAME_LONG_MULTICAST_TIMEOUT;
                lpoint->link.lan.lanNameSynchMasterTimer = LANNAME_TIMER_INACTIVE;
                lpoint->link.lan.lanNameChanges++;
                lpoint->link.lan.lanNameStableTime = elapsed_time;
                LanNameSend( lpoint, NULL );
                LanNameNotify( lpoint );
                break;

case LANNAME_STATE_SLAVE_UNSTABLE:
                lpoint->link.lan.lanNameMulticastTimer = LANNAME_TIMER_INACTIVE;
                lpoint->link.lan.lanNameSynchMasterTimer = 0;
                lpoint->link.lan.lanNameSynchMasterTimeout = LANNAME_MASTER_TIMEOUT;
                break;

case LANNAME_STATE_SLAVE_STABLE:
                lpoint->link.lan.lanNameMulticastTimer = LANNAME_TIMER_INACTIVE;
                lpoint->link.lan.lanNameSynchMasterTimer = 0;
                lpoint->link.lan.lanNameSynchMasterTimeout = LANNAME_MASTER_TIMEOUT;
                lpoint->link.lan.lanNameChanges++;
                lpoint->link.lan.lanNameStableTime = elapsed_time;
                LanNameNotify( lpoint );
                break;

default:
                crash( CRASH_LANNAME_BAD_STATE );
        }
    }
}

GLOBAL VOID
LanNameNewPriority()
{
    FAST LINK_DATA_STR  *lpoint;
    FAST UCOUNT         i;

/* the bridge id has been updated by now */
    for ( i = base_lan; i < base_lan + ci.max_lan; i++ )
    {
        lpoint = link_table_ptrs[ i ];

lpoint->link.lan.lanNameLinkId.priority = bridge_data.work.priority;

if ( stp_id_cmp( &lpoint->link.lan.lanNameId,
                         &lpoint->link.lan.lanNameLinkId ) == 1 )
        {
if DEBUG
            if ( lanNameDebug )
            {
                do_dtm();
                dprintf( "New Priority for link %04X\n", lpoint );
            }
endif
            switch( lpoint->link.lan.lanNameStateCur )
            {
                case LANNAME_STATE_OPERATER_DISABLE:
                case LANNAME_STATE_MASTER_UNSTABLE:
                    stp_id_cpy( &lpoint->link.lan.lanNameId, &lpoint->link.lan.lanNameLinkId );
                    break;
```

```
                    case LANNAME_STATE_MASTER_STABLE:
                        stp_id_cpy( &lpoint->link.lan.lanNameId, &lpoint->link.lan.lanNameLinkId );
                        lpoint->link.lan.lanNameChanges++;
                        lpoint->link.lan.lanNameStableTime = elapsed_time;
                        LanNameNotify( lpoint );
                        break;

case LANNAME_STATE_SLAVE_UNSTABLE:
                    case LANNAME_STATE_SLAVE_STABLE:
                        lpoint->link.lan.lanNameStateNew = LANNAME_STATE_MASTER_UNSTABLE;
                        process_signal( lpoint->link.lan.lanNamePcb, SIG_WAKEUP );
                        break;

default:
                        crash( CRASH_LANNAME_BAD_STATE );
                }
            }
            else if ( nlink_addr_cmp( &lpoint->link.lan.lanNameId.id,
                                      &lpoint->link.lan.lanNameLinkId.id ) == 0 )
            {
                stp_id_cpy( &lpoint->link.lan.lanNameId, &lpoint->link.lan.lanNameLinkId );
                if ( lpoint->link.lan.lanNameStateCur == LANNAME_STATE_MASTER_STABLE )
                {
                    lpoint->link.lan.lanNameChanges++;

lpoint->link.lan.lanNameStableTime = elapsed_time;
                    LanNameNotify( lpoint );
                }
            }
        }
    }
}

GLOBAL VOID
LanNameNewConfiguration()
{
    FAST UCOUNT            i;
    FAST LINK_DATA_STR     *lpoint;

for ( i = base_lan; i < base_lan + ci.max_lan; i++ )
    {
        lpoint = link_table_ptrs[ i ];

if ( bridge_data.work.parallel == BRIDGE_PARALLEL_AUTO )
        {
            if ( lpoint->link.lan.lanNameStateCur == LANNAME_STATE_OPERATER_DISABLE )
            {
                lpoint->link.lan.lanNameStateNew = LANNAME_STATE_MASTER_UNSTABLE;
                process_signal( lpoint->link.lan.lanNamePcb, SIG_WAKEUP );
            }
        }
        else
        {
            if ( lpoint->link.lan.lanNameStateCur != LANNAME_STATE_OPERATER_DISABLE )
            {
                lpoint->link.lan.lanNameStateNew = LANNAME_STATE_OPERATER_DISABLE;
                process_signal( lpoint->link.lan.lanNamePcb, SIG_WAKEUP );
            }
        }
    }
}

GLOBAL VOID
LanNameProcess( lpoint )
    FAST LINK_DATA_STR    *lpoint;
{
    FAST SIGNAL_MASK     events;

nlink_addr_cpy( &lpoint->link.lan.lanNameLinkId.id, &lpoint->link_address );
    lpoint->link.lan.lanNameLinkId.priority = bridge_data.work.priority;

LanNameNewConfiguration();

LanNameStateMachine( lpoint );

/* wait for listening to go by the first time; just wait */
/*  timer_set( lpoint->link.lan.lanNameTimer, bridge_data.stp_forward_delay * 100 );*/
    timer_set( lpoint->link.lan.lanNameTimer, LANNAME_TIMEOUT );

while ( TRUE )
    {
        events = process_wait( SIG_ANYTHING );

if ( events & SIG_RECEIVE )
            LanNameInput( lpoint );
```

```
if ( events & SIG_WAKEUP )
    LanNameStateMachine( lpoint );

if ( events & SIG_TIMEOUT )
{
    if ( ( lpoint->link.lan.lanNameMulticastTimer != LANNAME_TIMER_INACTIVE ) &&
         ( ++lpoint->link.lan.lanNameMulticastTimer ) >= lpoint->link.lan.lanNameMulticastTimeout )
    {
if DEBUG
        if ( lanNameDebug )
        {
            do_dtm();
            dprintf( "Multicast Timeout for link %04X\n", lpoint );
        }
endif
        LanNameSend( lpoint, NULL );
        lpoint->link.lan.lanNameMulticastTimer = 0;
    } if ( ( ( lpoint->link.lan.lanNameSynchMasterTimer != LANNAME_TIMER_INACTIVE ) &&
           ( ++lpoint->link.lan.lanNameSynchMasterTimer ) >= lpoint->link.lan.lanNameSynchMasterTimeout )
    {
        LanNameSynchMasterTimeout( lpoint );
    } timer_set( lpoint->link.lan.lanNameTimer, LANNAME_TIMEOUT );
}

} /* end of while */
}
```

```
/*@(#)brpara.c  2.1*/
#include "xyplex.h"
#include "target.h"
#include "config.h"
#include "crash.h"
#include "process.h"
#include "timer.h"
#include "nlink.h"
#include "lat.h"
#include "packet.h"
#include "xyplex_69A.h"
```

```
#include "priority.h"
#include "wan.h"
#include "stp.h"
#include "link.h"
#include "filter.h"
#include "bridge.h"
#include "brpara.h"

#ifndef clock_H
#include "clock.h"
endif ifndef locallink_H
include "locallink.h"
endif ifndef server_H
include "server.h"
endif ifndef interface_H
include "interface.h"
#endif

GLOBAL LINK_BIT_MAP    brParaStpLocalOutMask;
GLOBAL LINK_BIT_MAP    brParaStpOutMask;
GLOBAL UCOUNT          brParaConfig;
#if DEBUG
GLOBAL BOOLEAN  brParaDebug = FALSE;
GLOBAL BOOLEAN  brParaDebug2 = FALSE;
endif BrParaInit()
{
    FAST UCOUNT       i;
    FAST INTF_DATA_STR  *intfPoint;

/* for ( i = base_lan; i < intfMax; i++ ) */
    for ( i = base_lan; i < base_lan + cl.max_lan; i++ )
    {
        intfPoint = intfTblPtrs[ i ];
        if ( !intfPoint->work.inUse )
            continue;

if ( (intfPoint->brParaPcb = process_create( 1, BrParaProcess,
                                          0, intfPoint, "brpara" )) == NULL )
            crash( CRASH_BRPARA_CANT_INIT );

if ( (intfPoint->brParaTimer =
                timer_alloc( intfPoint->brParaPcb )) == NULL )
            crash( CRASH_BRPARA_CANT_INIT );

if ( (intfPoint->brParaGroupData = (BRPARA_GROUP_STR *)
                mem_alloc( sizeof(BRPARA_GROUP_STR) * BRPARA_BUCKETS )) == NULL )
            crash( CRASH_BRPARA_CANT_INIT );

que_init( &intfPoint->brParaQue );

intfPoint->brParaStateCur = BRPARA_STATE_INIT;
        intfPoint->brParaStateNew = BRPARA_STATE_NO_STABLE;

intfPoint->brParaBuckets = intfPoint->brParaBucket;
        intfPoint->brParaStpState = STP_INTF_STATE_DISABLED;
    } for ( i = base_wan; i < base_wan + cl.max_wan; i++ )
    {
        intfPoint = intfTblPtrs[ i ];
        if ( !intfPoint->work.inUse )
            continue;

intfPoint->brParaBuckets = intfTblPtrs[ base_lan ]->brParaBuckets;
        intfPoint->brParaStpState = STP_INTF_STATE_DISABLED;
    }

/* for locallink */
    intfPoint = intfTblPtrs[ locallink_number ];
    intfPoint->brParaBuckets = intfTblPtrs[ base_lan ]->brParaBuckets;
    intfPoint->brParaStpState = STP_INTF_STATE_FORWARDING;
    brParaStpOutMask = 1 << locallink_number;
    brParaStpLocalOutMask = 1 << locallink_number;
```

```
        xyplex_SSA_attach( XYPLEX_SSA_BRIDGE_PARALLEL, BrParaReceive );
        LanNameAttach( BrParaLanStable );
        wan_attach_notify( BrParaNewWanState );
} if DEBUG
IMPORT UTINY        clock_ticks;

LOCAL VOID co_dtm()
{
        TEXT        buf[32];

clock_dat2txt( clock_getdate(), &buf[0] );
    buf[11] = ' ';
    buf[12] = ' ';
    clock_tim2txt( clock_gettime(), &buf[13] );
    sprintf( &buf[21],".%02u", clock_ticks );
    buf[24] = ' ';
    buf[25] = ' ';
    buf[26] = '\0';
    debug_printstr( buf );
}
endif GLOBAL VOID
BrParaLanStable( intfPoint )
    FAST INTF_DATA_STR  *intfPoint;
{ if DEBUG
    if ( brParaDebug || brParaDebug2 )
    {
        co_dtm();
        printf( "BrPara Lan Stable for interface %04X\n", intfPoint );
    }
endif intfPoint->brParaLanState = BRPARA_LAN_STABLE;
    stp_id_cpy( &intfPoint->brParaLocalLanId, &intfPoint->link->link.lan.lanNameId );

switch( intfPoint->brParaStateCur )
    {
        case BRPARA_STATE_BAD_TOPOLOGY:
        case BRPARA_STATE_OPERATER_DISABLE:
            break;

case BRPARA_STATE_NO_STABLE:
            intfPoint->brParaStateNew = BRPARA_STATE_LOCAL_STABLE;
            process_signal( intfPoint->brParaFcb, SIG_WAKEUP );
            break;

case BRPARA_STATE_SAME_LAN:
        case BRPARA_STATE_REMOTE_STABLE:
            intfPoint->brParaStateNew = BRPARA_STATE_BOTH_STABLE;
            process_signal( intfPoint->brParaFcb, SIG_WAKEUP );
            break;

case BRPARA_STATE_LOCAL_STABLE:
        case BRPARA_STATE_BOTH_STABLE:
            break;

case BRPARA_STATE_SLAVE:
        case BRPARA_STATE_NOT_MASTER_INIT:
        case BRPARA_STATE_NOT_MASTER_WAIT:
        case BRPARA_STATE_NOT_MASTER:
        case BRPARA_STATE_MASTER_INIT:
        case BRPARA_STATE_MASTER_WAIT:
        case BRPARA_STATE_MASTER:
        case BRPARA_STATE_MASTER_STOP:
            intfPoint->brParaStateNew = BRPARA_STATE_BOTH_STABLE;
            process_signal( intfPoint->brParaFcb, SIG_WAKEUP );
            break;

default:
            crash( CRASH_BRPARA_BAD_STATE );
            break;
    }
}

GLOBAL VOID
```

```
BrParaReceive( packet )
    FAST PACKET_STR         *packet;
{
    FAST BRPARA_MSG_STR     *msg;
    FAST INTF_DATA_STR      *intfPoint;

intfPoint = intfTblPtrs[ packet->receiveIntf ];

/* never keep packet in these cases */
    if ( bridge_data.work.parallel != BRIDGE_PARALLEL_AUTO ||
         intfPoint->link->link_type != LAN_LINK )
    {
        packet_free( packet );
        return;
    } msg = (BRPARA_MSG_STR *)packet->ptr;

if DEBUG
    if (brParaDebug)
    {
        co_atm();
        ctprintf( "BrParaReceive message from link %04X, type %d\n", intfPoint, msg->hdr.type);
    }
endif if ( msg->hdr.version != BRPARA_MSG_VERSION ||
         msg->hdr.config  != brParaConfig ||
         msg->hdr.type    <= BRPARA_MSG_FIRST ||
         msg->hdr.type    >= BRPARA_MSG_LAST )
    {
        packet_free( packet );
        return;
    } que_install( &intfPoint->brParaQue, packet );
    process_signal( intfPoint->brParaPcb, SIG_RECEIVE );
    return;
}

GLOBAL VOID
BrParaWanReceive( packet )
    FAST PACKET_STR         *packet;
{
    FAST BRPARA_MSG_STR     *msg;
    FAST INTF_DATA_STR      *intfPoint;

if ( bridge_data.work.parallel != BRIDGE_PARALLEL_AUTO )
    {
        packet_free( packet );
        return;
    } packet->ptr = (UTINY *)packet->ptr + sizeof( WAN_MULT_HDR );

msg = (BRPARA_MSG_STR *)packet->ptr;

if ( msg->hdr.version != BRPARA_MSG_VERSION ||
         msg->hdr.config  != brParaConfig ||
         msg->hdr.type    <= BRPARA_MSG_FIRST ||
         msg->hdr.type    >= BRPARA_MSG_LAST )
    {
        packet_free( packet );
        return;
    } intfPoint= intfTblPtrs[ base_lan ];

if DEBUG
    if (brParaDebug)
    {
        co_atm();
        ctprintf( "BrParaWanReceive message from link %04X, type %d\n", intfPoint, msg->hdr.type)
    }
endif que_install( &intfPoint->brParaQue, packet );
    process_signal( intfPoint->brParaPcb, SIG_RECEIVE );
    return;
}

GLOBAL BOOLEAN
BrParaSamePartner()
{
```

BEST AVAILABLE COPY

```
    FAST BOOLEAN           samePartner;
    FAST UCOUNT            i;
    FAST INTF_DATA_STR     *intfPoint;
    FAST INTF_DATA_STR     *opoint;
    FAST UTINY             wanLinksUp;

intfPoint = intfTblPtrs[ base_lan ];

wanLinksUp = 0;
    samePartner = ( intfPoint->work.stpState == TRUE );

intfPoint = intfTblPtrs[ base_wan ];

/* for ( i = base_wan; i < intfMax; i++ ) */
    for ( i = base_wan; i < base_wan + ci.max_wan; i++ )
    {
        opoint = intfTblPtrs[ i ];
        if ( !opoint->work.inUse )
            continue;

if ( opoint->link->forward_link_state == WAN_STATE_DOWN )
            continue;

if (  intfPoint->link->forward_link_state == WAN_STATE_DOWN )
        {
            intfPoint = opoint;
        } if ( opoint->work.stpState != TRUE )
        {
            samePartner = FALSE;
            break;
        } wanLinksUp++;

if ( intfPoint == opoint )
            continue;

if ( nlink_addr_cmp( &intfPoint->link->partner.ethernet_address,
                             &opoint->link->partner.ethernet_address ) != 0 )
        {
            samePartner = FALSE;
            break;
        } if ( intfPoint->link->work.wanProtocolType !=
             opoint->link->work.wanProtocolType)
        {
            samePartner = FALSE;
            break;
        }
    }

/* bad topology if no wan links are up */
    if ( ci.max_wan != 0 && wanLinksUp == 0 ||
         intfPoint->link->work.wanProtocolType != WAN_PROTOCOL_XYP)
        samePartner = FALSE;

return samePartner );
}

GLOBAL VOID
BrParaNewIntfState()
{
    FAST BOOLEAN           samePartner;
    FAST UCOUNT            i;
    FAST INTF_DATA_STR     *intfPoint;

samePartner = BrParaSamePartner();

for ( i = base_lan; i < base_lan + ci.max_lan; i++ )
    {
        intfPoint = intfTblPtrs[ i ];

if ( !intfPoint->work.inUse )
            continue;

if ( samePartner )
        {
            if ( intfPoint->brParaStateCur == BRPARA_STATE_BAD_TOPOLOGY )
            {
```

```
                    intfPoint->brParaStateNew = BRPARA_STATE_NO_STABLE;
                    process_signal( intfPoint->brParaPcb, SIG_WAKEUP );
                }
                else
                {
                    if ( intfPoint->brParaStateCur != BRPARA_STATE_BAD_TOPOLOGY &&
                         intfPoint->brParaStateCur != BRPARA_STATE_OPERATER_DISABLE )
                    {
                        intfPoint->brParaStateNew = BRPARA_STATE_BAD_TOPOLOGY;
                        process_signal( intfPoint->brParaPcb, SIG_WAKEUP );
                    }
                }
        }
}

GLOBAL VOID
BrParaNewWanState( state, intf )
    FAST UTINY    state;
    FAST UTINY    intf;
{
    BrParaNewIntfState();
}

GLOBAL VOID
BrParaSetStePathCost( intfPoint )
    FAST INTF_DATA_STR  *intfPoint;
{
    FAST UCOUNT          i;
    FAST STP_COST        pathCost;
    FAST INTF_DATA_STR  *wpoint;

if ( intfPoint->brParaActive )
    {
        if ( ci.max_wan == 0 )
            pathCost = intfPoint->brParaPairPathCost;
        else
            pathCost = 1;
        StpSetIntfCost( intfPoint->assignedIntf, pathCost );
    }
    else
        StpSetIntfCost( intfPoint->assignedIntf, intfPoint->pathCost );

for ( i = base_wan; i < base_wan + ci.max_wan; i++ )
    {
        wpoint = intfTblPtrs[ i ];

if ( !wpoint->work.inUse )
            continue;

if ( intfPoint->brParaActive )
            pathCost = intfPoint->brParaPairPathCost;
        else
            pathCost = wpoint->pathCost;

StpSetIntfCost( wpoint->assignedIntf, pathCost );
    }
}

GLOBAL VOID
BrParaNewLoadBalance( intfPoint )
    FAST INTF_DATA_STR  *intfPoint;
{
    FAST UCOUNT              i;
    FAST BRPARA_GROUP_STR   *neighbor;

#if DEBUG
    if ( brParaDebug || brParaDebug2 )
    {
        sp_atm();
        sprintf( "BrPara Perform new load balance for interface %04X\n", intfPoint );
    }
endif
    switch ( intfPoint->brParaStateCur )
    {
        case BRPARA_STATE_MASTER_INIT:
        case BRPARA_STATE_MASTER_WAIT:
        case BRPARA_STATE_MASTER:
```

```
            intfPoint->brParaStateNew = BRPARA_STATE_MASTER_STOP;
            process_signal( intfPoint->brParaFcb, SIG_WAKEUP );
            break;

case BRPARA_STATE_MASTER_STOP:
            /* just reset the buckets */
            BrParaClearBuckets( intfPoint );
            break;

default:
            crash( CRASH_BRPARA_BAD_STATE );
            break;
    }
}

GLOBAL VOID
BrParaNewPairPathCost( intfPoint )
    FAST INTF_DATA_STR *intfPoint;
{ if DEBUG
    if ( brParaDebug || brParaDebug2 )
    {
         do_dtm();
        dprintf( "BrPara new pair pathCost for interface %04X\n", intfPoint );
    }
endif /* things are unstable so shorten timer and transmit message below */
    intfPoint->brParaTransmitTimeout = BRPARA_SHORT_TRANSMIT_TIMEOUT;
    intfPoint->brParaTransmitCount = 0;

switch ( intfPoint->brParaStateCur )
    {
        case BRPARA_STATE_MASTER_INIT:
        case BRPARA_STATE_MASTER_WAIT:
        case BRPARA_STATE_MASTER:
        case BRPARA_STATE_MASTER_STOP:
            BrParaNewLoadBalance( intfPoint );
            break;

case BRPARA_STATE_NOT_MASTER_INIT:
        case BRPARA_STATE_NOT_MASTER_WAIT:
        case BRPARA_STATE_NOT_MASTER:
            intfPoint->brParaPairPathCost =
                ( intfPoint->brParaSelf.neighbor.pathCost +
                  intfPoint->brParaSelf.partner.pathCost ) / 2;
            /* fall through */
        case BRPARA_STATE_SLAVE:
            BrParaSetStpPathCost( intfPoint );
            break;
    }

/* transmit changes */
    BrParaTransmit( intfPoint );
}

GLOBAL VOID
BrParaCalcPathcost( intfPoint )
    FAST INTF_DATA_STR *intfPoint;
{
    FAST UCOUNT         i;
    FAST INTF_DATA_STR  *opoint;
    FAST ULONG          pathCost;

pathCost = 0;

/* if there are wan links, there can only be one active partner.  So find any
       active link and take its masters pathcost */
    for ( i = base_wan; i < base_wan + ci.max_wan; i++ )
    {
        opoint = intfTblPtrs[i];

if ( !opoint->work.inUse )
            continue;

if ( opoint->link->forward_link_state == WAN_STATE_DOWN )
            continue;

opoint = intfTblPtrs[ opoint->link->master_link ];
```

```
        pathCost = opoint->pathCost;
        break;
    } pathCost += intfPoint->pathCost;
    if ( intfPoint->brParaSelf.neighbor.pathCost != pathCost )
    {
        intfPoint->brParaSelf.neighbor.pathCost = pathCost;

if ( intfPoint->brParaStateCur != BRPARA_STATE_SLAVE )
            BrParaNewPairPathCost( intfPoint );
        else
        {
            /* things are unstable so shorten timer and transmit message below */
            intfPoint->brParaTransmitTimeout = BRPARA_SHORT_TRANSMIT_TIMEOUT;
            intfPoint->brParaTransmitCount = 0;
            BrParaTransmit( intfPoint );
        }
    }
}

GLOBAL VOID
BrParaPathCost( intfPoint )
    FAST INTF_DATA_STR      *intfPoint;
{ if DEBUG
    if ( brParaDebug || brParaDebug2 )
    {
        sc_atm();
        c_printf( "BrPara new pathcost for interface %04X\n", intfPoint );
    }
endif BrParaCalcPathcost( intfPoint );

switch( intfPoint->brParaStateCur )
    {
        case BRPARA_STATE_INIT:
        case BRPARA_STATE_BAD_TOPOLOGY:
        case BRPARA_STATE_SAME_LAN:
        case BRPARA_STATE_OPERATER_DISABLE:
        case BRPARA_STATE_REMOTE_STABLE:
        case BRPARA_STATE_NO_STABLE:
        case BRPARA_STATE_LOCAL_STABLE:
        case BRPARA_STATE_BOTH_STABLE:
        case BRPARA_STATE_SLAVE:
        case BRPARA_STATE_NOT_MASTER_INIT:
        case BRPARA_STATE_NOT_MASTER_WAIT:
        case BRPARA_STATE_NOT_MASTER:
            break;

case BRPARA_STATE_MASTER_INIT:
        case BRPARA_STATE_MASTER_WAIT:
        case BRPARA_STATE_MASTER:
        case BRPARA_STATE_MASTER_STOP:
            intfPoint->brParaStateNew = BRPARA_STATE_MASTER_STOP;
            process_signal( intfPoint->brParaPcb, SIG_WAKEUP );
            break;

default:
            crash( CRASH_BRPARA_BAD_STATE );
            break;
    }
}

GLOBAL VOID
BrParaNewPathCost( intfPoint )
    FAST INTF_DATA_STR      *intfPoint;
{
    FAST ICOUNT             i;
    FAST INTF_DATA_STR      *opoint;

if ( intfPoint->link->link_type == LAN_LINK )
        BrParaPathCost( intfPoint );
    else
    {
        for ( i = base_lan; i < base_lan + ci.max_lan; i++ )
        {
            opoint = intfTblPtrs[ i ];
            if ( !opoint->work.inUse )
                continue;
```

```
            BrParaPathCost( opoint );
        }
    }

GLOBAL VOID
BrParaNewPriority()
{
    FAST INTF_DATA_STR  *intfPoint;
    FAST UCOUNT          i;

/* the bridge id has been updated by now */
    for ( i = base_lan; i < base_lan + ci.max_lan; i++ )
    {
        intfPoint = intfTblPtrs[ i ];

if ( !intfPoint->work.inUse )
            continue;

intfPoint->brParaSelf.neighbor.id.priority = bridge_data.work.priority;

if ( stp_id_cmp( &intfPoint->brParaGroupMasterId,
                         &intfPoint->brParaSelf.neighbor.id ) == 1 )
#if DEBUG
            if ( brParaDebug || brParaDebug2 )
            {
                do_dtm();
                dprintf( "BrPara New Priority for interface %04X\n", intfPoint );
            }
endif
            switch( intfPoint->brParaStateCur )
            {
                case BRPARA_STATE_INIT:
                case BRPARA_STATE_BAD_TOPOLOGY:
                case BRPARA_STATE_SAME_LAN:
                case BRPARA_STATE_OPERATER_DISABLE:
                case BRPARA_STATE_REMOTE_STABLE:
                case BRPARA_STATE_NO_STABLE:
                case BRPARA_STATE_LOCAL_STABLE:
                case BRPARA_STATE_BOTH_STABLE:
                    break;

case BRPARA_STATE_SLAVE:
                case BRPARA_STATE_NOT_MASTER_INIT:
                case BRPARA_STATE_NOT_MASTER_WAIT:
                case BRPARA_STATE_NOT_MASTER:
                    intfPoint->brParaStateNew = BRPARA_STATE_BOTH_STABLE;
                    process_signal( intfPoint->brParaPcb, SIG_WAKEUP );
                    break;

case BRPARA_STATE_MASTER_INIT:
                case BRPARA_STATE_MASTER_WAIT:
                case BRPARA_STATE_MASTER:
                case BRPARA_STATE_MASTER_STOP:
                    stp_id_cpy( &intfPoint->brParaGroupMasterId,
                                &intfPoint->brParaSelf.neighbor.id );
                    break;

default:
                    crash( CRASH_BRPARA_BAD_STATE );
            }
        else if ( nlink_addr_cmp( &intfPoint->brParaGroupMasterId.id,
                                  &intfPoint->brParaSelf.neighbor.id.id ) == 0 )

stp_id_cpy( &intfPoint->brParaGroupMasterId,
                        &intfPoint->brParaSelf.neighbor.id );

}
}

GLOBAL VOID
BrParaNewConfiguration()
{
    FAST UCOUNT          i;
    FAST INTF_DATA_STR  *intfPoint;

for ( i = base_lan; i < base_lan + ci.max_lan; i++ )
    {
```

```
        intfPoint = intfTblPtrs[ i ];

if ( !intfPoint->work.inUse )
            continue;

if ( bridge_data.work.parallel == BRIDGE_PARALLEL_AUTO )
            if ( intfPoint->brParaStateCur == BRPARA_STATE_OPERATER_DISABLE )
            {
                if ( BrParaSamePartner() )
                    intfPoint->brParaStateNew = BRPARA_STATE_NO_STABLE;
                else
                    intfPoint->brParaStateNew = BRPARA_STATE_BAD_TOPOLOGY;
                process_signal( intfPoint->brParaPcb, SIG_WAKEUP );
            }
        }
        else
        {
            if ( intfPoint->brParaStateCur != BRPARA_STATE_OPERATER_DISABLE )
            {
                intfPoint->brParaStateNew = BRPARA_STATE_OPERATER_DISABLE;
                process_signal( intfPoint->brParaPcb, SIG_WAKEUP );
            }
        }
    }
}

LOCAL UTINY brParaStpStateTbl[5][5] =
{   {   STP_INTF_STATE_DISABLED,        /* disabled, disabled */
        STP_INTF_STATE_DISABLED,        /* disabled, listening */
        STP_INTF_STATE_DISABLED,        /* disabled, learning */
        STP_INTF_STATE_DISABLED,        /* disabled, forwarding */
        STP_INTF_STATE_DISABLED },      /* disabled, blocking */
    {   STP_INTF_STATE_DISABLED,        /* listening, disabled */
        STP_INTF_STATE_LISTENING,       /* listening, listening */
        STP_INTF_STATE_LISTENING,       /* listening, learning */
        STP_INTF_STATE_LISTENING,       /* listening, forwarding */
        STP_INTF_STATE_BLOCKING },      /* listening, blocking */
    {   STP_INTF_STATE_DISABLED,        /* learning, disabled */
        STP_INTF_STATE_LISTENING,       /* learning, listening */
        STP_INTF_STATE_LEARNING,        /* learning, learning */
        STP_INTF_STATE_LEARNING,        /* learning, forwarding */
        STP_INTF_STATE_BLOCKING },      /* learning, blocking */
    {   STP_INTF_STATE_DISABLED,        /* forwarding, disabled */
        STP_INTF_STATE_LISTENING,       /* forwarding, listening */
        STP_INTF_STATE_LEARNING,        /* forwarding, learning */
        STP_INTF_STATE_FORWARDING,      /* forwarding, forwarding */
        STP_INTF_STATE_BLOCKING },      /* forwarding, blocking */
    {   STP_INTF_STATE_DISABLED,        /* blocking, disabled */
        STP_INTF_STATE_BLOCKING,        /* blocking, listening */
        STP_INTF_STATE_BLOCKING,        /* blocking, learning */
        STP_INTF_STATE_BLOCKING,        /* blocking, forwarding */
        STP_INTF_STATE_BLOCKING }       /* blocking, blocking */
};

GLOBAL UTINY
BrParaStpState( state1, state2 )
    FAST UTINY  state1;
    FAST UTINY  state2;
{
if DEBUG
    if ( state1 > STP_INTF_STATE_BLOCKING ||
         state2 > STP_INTF_STATE_BLOCKING )
        crash( CRASH_BRPARA_BAD_STATE );
endif return( brParaStpStateTbl[ state1 ][ state2 ] );
}

GLOBAL VOID
BrParaSetNewStpState( intfPoint, state )
    FAST INTF_DATA_STR  *intfPoint;
    FAST UTINY          state;
{
    intfPoint->brParaStpState = state;

switch( state )
    {
        case STP_INTF_STATE_FORWARDING:
            intfPoint->brParaLearnFlag = TRUE;
```

```
                brParaStpOutMask |= 1 << intfPoint->work.linkId;
                brParaStpLocalOutMask |= 1 << intfPoint->work.linkId;
                break;

case STP_INTF_STATE_LEARNING:
                intfPoint->brParaLearnFlag = TRUE;
                brParaStpOutMask &= ~(1 << intfPoint->work.linkId);
                brParaStpLocalOutMask |= 1 << intfPoint->work.linkId;
                break;

default:
                intfPoint->brParaLearnFlag = FALSE;
                brParaStpOutMask &= ~(1 << intfPoint->work.linkId);
                brParaStpLocalOutMask &= ~(1 << intfPoint->work.linkId);
                break;
        }
    }

GLOBAL VOID
BrParaSetStpState( intfPoint )
    FAST INTF_DATA_STR  *intfPoint;
{
    FAST UTINY          newStpState;
    FAST UCOUNT         i;
    FAST INTF_DATA_STR  *opoint;

switch( intfPoint->brParaStateCur )
    {
        case BRPARA_STATE_MASTER_INIT:
        case BRPARA_STATE_MASTER_WAIT:
        case BRPARA_STATE_MASTER:
        case BRPARA_STATE_MASTER_STOP:
            if ( bridge_data.stpActive )
            {
                newStpState = BrParaStpState( intfPoint->brParaOurStpState,
                                              intfPoint->brParaMasterStpState );
            }
            else
                newStpState = STP_INTF_STATE_FORWARDING;
            break;

case BRPARA_STATE_SLAVE:
            newStpState = intfPoint->brParaMasterStpState;
            if ( newStpState == STP_INTF_STATE_BLOCKING )
                newStpState = STP_INTF_STATE_FORWARDING;
            break;

default:
            newStpState = intfPoint->brParaMasterStpState;
            break;
    } if ( ci.max_wan == 0 ) /* case local bridge */
    {
        if ( newStpState != intfPoint->brParaStpState )
        {
            /* things are unstable so shorten timer and transmit message below */
            intfPoint->brParaTransmitTimeout = BRPARA_SHORT_TRANSMIT_TIMEOUT;
            intfPoint->brParaTransmitCount = 0;

BrParaSetOneStpState( intfPoint, newStpState );
            /* transmit changes */
            BrParaTransmit( intfPoint );
        }
    }
    else
    {
        if ( newStpState != intfTblPtrs[ base_wan ]->brParaStpState )
        {
            /* things are unstable so shorten timer and transmit message below */
            intfPoint->brParaTransmitTimeout = BRPARA_SHORT_TRANSMIT_TIMEOUT;
            intfPoint->brParaTransmitCount = 0;

BrParaSetOneStpState( intfPoint, STP_INTF_STATE_FORWARDING );
            /* set the wan links stp state too! for forwarding from them */
            for ( i = base_wan; i < base_wan + ci.max_wan; i++ )
            {
                if ( !intfTblPtrs[ i ]->work.inUse )
                    continue;
```

```
                BrParaSetOneStpState( intfTblPtrs[ i ], newStpState );
            }

/* transmit changes */
            BrParaTransmit( intfPoint );
        }
    }
}

GLOBAL VOID
BrParaNewStpState()
{
    FAST UCOUNT         i;
    FAST INTF_DATA_STR  *intfPoint;
    FAST INTF_DATA_STR  *lanPoint;

/* set all lan links */
    for ( i = base_lan; i < base_lan + ci.max_lan; i++ )
    {
        intfPoint = intfTblPtrs[ i ];

if ( !intfPoint->work.inUse )
            continue;

intfPoint->brParaOurStpState = intfPoint->stp_state;
    }

/* then update for any wan data */
    lanPoint = intfTblPtrs[ base_lan ];

for ( i = base_wan; i < base_wan + ci.max_wan; i++ )
    {
        intfPoint = intfTblPtrs[ i ];

if ( !intfPoint->work.inUse )
            continue;

if ( intfPoint->work.linkId != intfPoint->link->master_link )
            continue;

if ( intfPoint->link->forward_link_state == WAN_STATE_DOWN )
            continue;

lanPoint->brParaOurStpState =
            BrParaStpState( intfPoint->stp_state, lanPoint->stp_state );
    }

/* update the real stp state not just our own local value */
    for ( i = base_lan; i < base_lan + ci.max_lan; i++ )
    {
        intfPoint = intfTblPtrs[ i ];

if ( !intfPoint->work.inUse )
            continue;

BrParaSetStpState( intfPoint );
    }
}

GLOBAL VOID
BrParaSetConfig()
{
    brParaConfig = 0;
    if ( bridge_data.work.forwarding )
        brParaConfig |= BRPARA_CONFIG_BRIDGE;
    if ( bridge_data.work.parallel )
        brParaConfig |= BRPARA_CONFIG_BRIDGE_PARALLEL;
    if ( server_data.work.ipRouting )
    {
        brParaConfig |= BRPARA_CONFIG_IP;
        if ( server_data.work.ospf )
            brParaConfig |= BRPARA_CONFIG_OSPF;
    }
    if ( server_data.work.ipx )
        brParaConfig |= BRPARA_CONFIG_IPX;

/* in future other configs will have to be set */
}
```

```
/****************************************************************
 ****************************************************************
 ********************** Send Routines ***************************
 ****************************************************************
 ****************************************************************/

GLOBAL VOID
BrParaWanGenericSend( sintfPoint, packet )
    FAST INTF_DATA_STR      *sintfPoint;
    FAST PACKET_STR         *packet;
{
    FAST INTF_DATA_STR      *dintfPoint;
    FAST LCOUNT             i;
    FAST BPH_STR            *bph;
    FAST WAN_MULT_HDR       *header;

/* assume for now this will be a que to the other link or a send out
       a wan link */ for ( i = base_lan; i < base_lan + ci.max_lan + ci.max_wan; i++ )
    {
        dintfPoint = intfTblPtrs[ i ];

if ( !dintfPoint->work.inUse )
            continue;

if ( dintfPoint != sintfPoint )
        {
            if ( dintfPoint->link->link_type == LAN_LINK )
            {
                que_install( &dintfPoint->brParaQue, packet );
                process_signal( dintfPoint->brParaPcb, SIG_RECEIVE );
                return;
            }
            else
            {
                /* if we were not on a valid configuration we wouldn't be sending this p
                /* so look for the first link that is up */
                if ( dintfPoint->link->forward_link_state != WAN_STATE_DOWN )
                {
                    BPH_ALLOC( bph, packet );
                    /* create header and send packet */
                    bph->priority = packet->priority = PRIORITY_OVERRIDE;
                    bph->header_index = 0;
                    bph->header_count = sizeof( WAN_MULT_HDR );
                    header = (WAN_MULT_HDR *)(bph->header_data);

header->header.xplex_wan.type = WANTYPE_CONTROL;
                    header->header.xplex_wan.subtype = WANSUBTYPE_PARALLEL;
                    header->header.xplex_wan.xplex_flag = TRUE;
                    header->header.xplex_wan.end = TRUE;
                    header->header.xplex_wan.seq_num = 0;

packet->send_mask = 1 << dintfPoint->work.linkId;
                    packet->sendIntf = bph->sendIntf = dintfPoint->assignedIntf;
                    packet->flags |= PACKET_FLAG_FLOOD_INTF;
                    packet->sendIntf = dintfPoint->assignedIntf;
                    packet->frSendDlci = 0;

bwan_send( dintfPoint->link, bph );
                    return;
                }
            }
        }
    }

/* if we got to here free the packet */
    packet_free( packet );
}

GLOBAL VOID
BrParaWanSend( intfPoint, type )
    FAST INTF_DATA_STR      *intfPoint;
    FAST TINY               type;
{
    FAST PACKET_STR         *packet;
    FAST BRPARA_MSG_STR     *msg;

if ( (packet = packet_alloc()) == NULL )
        return;
```

```
    msg = (BRPARA_MSG_STR *) packet->ptr;

msg->hdr.hdr.pad_count = 0;
    msg->hdr.hdr.type = XYPLEX_SBA_BRIDGE_PARALLEL;
    msg->hdr.type = type;
    msg->hdr.version = BRPARA_MSG_VERSION;
    msg->hdr.config = brParaConfig;

/* forward flag only matters from slave to master */
    if ( type == BRPARA_MSG_WAN_SLAVE )
        msg->msg.wan.stpState = intfPoint->brParaCurStpState;
    else if ( type == BRPARA_MSG_WAN_NON_MASTER )
        msg->msg.wan.stpState = intfPoint->brParaMasterStpState;
    else
    {
        if ( ci.max_wan == 0 )
            msg->msg.wan.stpState = intfPoint->brParaStpState;
        else
            msg->msg.wan.stpState = intfTblPtrs[ base_wan ]->brParaStpState;
    } msg->msg.wan.groupSize = 0;

/* only meaningful if not a slave message */
    msg->msg.wan.pairPathCost = intfPoint->brParaPairPathCost;

stp_id_cpy( &msg->msg.wan.localLanId, &intfPoint->brParaLocalLanId );
    stp_id_cpy( &msg->msg.wan.groupMasterId, &intfPoint->brParaGroupMasterId );
    block_move( &msg->msg.wan.self, &intfPoint->brParaSelf.neighbor,
                sizeof(BRPARA_BRIDGE_STR) );
    msg->msg.wan.self.state = intfPoint->brParaStateCur;

packet->count = sizeof(BRPARA_WAN_MSG_STR) + sizeof(BRPARA_MSG_HDR_STR);

if ( type == BRPARA_MSG_WAN_MASTER_LONG )
    {
        msg->msg.wan.groupSize = intfPoint->brParaGroupNumEntries;
#if MICRITEC
        block_move( (UTINY *) &msg->msg.wan + sizeof(msg->msg.wan), intfPoint->brParaGroupData,
                    sizeof(BRPARA_GROUP_STR) * intfPoint->brParaGroupNumEntries );
#else
        block_move( msg->msg.wan.groups, intfPoint->brParaGroupData,
                    sizeof(BRPARA_GROUP_STR) * intfPoint->brParaGroupNumEntries );
endif
        packet->count += sizeof(BRPARA_GROUP_STR) * intfPoint->brParaGroupNumEntries;
    } nlin_addr_cpy( &msg->hdr.hdr.ethernet.dest_addr, reserved_multicast );
    nlin_addr_cpy( &msg->hdr.hdr.ethernet.source_addr, &intfPoint->link->link_address );
    msg->hdr.hdr.ethernet.protocol = XYPLEX_SBA_PROTOCOL_TYPE;

#if DEBUG
    if ( brParaDebug )
    {
        io_ctm();
        cprintf( "BrPara Send Wan Packet %d for link %04X\n", type, intfPoint );
    }
endif BrParaWanGenericSend( intfPoint, packet );
}

GLOBAL VOID
BrParaNonMasterSend( intfPoint )
    FAST INTF_DATA_STR      *intfPoint;
{
    FAST PACKET_STR         *packet;
    FAST BRPARA_MSG_STR     *msg;

if ( (packet = packet_alloc()) == NULL )
        return;

msg = (BRPARA_MSG_STR *) packet->ptr;

msg->hdr.hdr.pad_count = 0;
    msg->hdr.hdr.type = XYPLEX_SBA_BRIDGE_PARALLEL;
    msg->hdr.type = BRPARA_MSG_NON_MASTER;
    msg->hdr.version = BRPARA_MSG_VERSION;
    msg->hdr.config = brParaConfig;

stp_id_cpy( &msg->msg.nonMaster.remoteLanId, &intfPoint->brParaRemoteLanId );
    block_move( &msg->msg.nonMaster.self, &intfPoint->brParaSelf,
                sizeof(BRPARA_GROUP_STR) );
    msg->msg.nonMaster.self.neighbor.state = intfPoint->brParaStateCur;

packet->count = sizeof(BRPARA_NON_MASTER_MSG_STR) + sizeof(BRPARA_MSG_HDR_STR);
    packet->send_mask = 1 << intfPoint->work.linkId;
```

```
        packet->flags |= PACKET_FLAG_FLOOD_INTF;
        packet->sendIntf = intfPoint->assignedIntf;
        packet->frSendDlci = 0;

nlink_addr_cpy( &msg->hdr.hdr.ethernet.dest_addr, &intfPoint->brParaGroupMasterId.id );
        nlink_addr_cpy( &msg->hdr.hdr.ethernet.source_addr, &intfPoint->link->link_address );
        msg->hdr.hdr.ethernet.protocol = XYPLEX_88A_PROTOCOL_TYPE;

#if DEBUG
        if ( brParaDebug )
        {
            cz_stm();
            sprintf( "BrPara Send NonMaster Packet for link %04X\n", intfPoint );
        }
endif forward_receive( packet );
}

GLOBAL VOID
BrParaMasterSend( intfPoint, type )
    FAST INTF_DATA_STR      *intfPoint;
    FAST UTINY              type;
{
    FAST PACKET_STR         *packet;
    FAST BRPARA_MSG_STR     *msg;
    FAST BOOLEAN            forward_flag;

if ( intfPoint->brParaGroupNumEntries == 0 )
        return;

if ( (packet = packet_alloc()) == NULL )
        return;

msg = (BRPARA_MSG_STR *) packet->ptr;

msg->hdr.hdr.pad_count = 0;
    msg->hdr.hdr.type = XYPLEX_88A_BRIDGE_PARALLEL;
    msg->hdr.type = type;
    msg->hdr.version = BRPARA_MSG_VERSION;
    msg->hdr.config = brParaConfig;

if ( type == BRPARA_MSG_SLAVE )
        msg->msg.wan.stpState = intfPoint->brParaMasterStpState;
    else
    {
        if ( cl.max_wan == 0 )
            msg->msg.wan.stpState = intfPoint->brParaStpState;
        else
            msg->msg.wan.stpState = intfTblPtrs[ base_wan ]->brParaStpState;
    } stp_id_cpy( &msg->msg.master.remoteLanId, &intfPoint->brParaRemoteLanId );
    stp_id_cpy( &msg->msg.master.groupMasterId, &intfPoint->brParaGroupMasterId );

if ( type == BRPARA_MSG_MASTER )
    {
        if ( stp_id_cmp( &intfPoint->brParaGroupMasterId,
                         &intfPoint->brParaSelf.neighbor.id ) != 0 )
        {
            /* there are a few small holes when this can happen */
            packet_free( packet );
            return;
        }

/* update the masters entry */
        block_move( intfPoint->brParaGroupData, &intfPoint->brParaSelf,
                    sizeof(BRPARA_GROUP_STR) );
        intfPoint->brParaGroupData[0].neighbor.state = intfPoint->brParaStateCur;
    } msg->msg.master.groupSize = intfPoint->brParaGroupNumEntries;
if MICRITEC
    block_move( (UTINY *) &msg->msg.master + sizeof (msg->msg.master), intfPoint->brParaGroupData,
                sizeof(BRPARA_GROUP_STR) * intfPoint->brParaGroupNumEntries );
#else
    block_move( msg->msg.master.groups, intfPoint->brParaGroupData,
                sizeof(BRPARA_GROUP_STR) * intfPoint->brParaGroupNumEntries );
endif packet->count = sizeof(BRPARA_MASTER_MSG_STR) + sizeof(BRPARA_MSG_HDR_STR);
    packet->count += sizeof(BRPARA_GROUP_STR) * intfPoint->brParaGroupNumEntries;

packet->send_mask = 1 << intfPoint->work.linkId;
    packet->flags |= PACKET_FLAG_FLOOD_INTF;
    packet->sendIntf = intfPoint->assignedIntf;
    packet->frSendDlci = 0;

nlink_addr_cpy( &msg->hdr.hdr.ethernet.dest_addr, reserved_multicasts );
    nlink_addr_cpy( &msg->hdr.hdr.ethernet.source_addr, &intfPoint->link->link_address );
```

```
    msg->hdr.hdr.ethernet.protocol = XYFLEX_BSA_PROTOCOL_TYPE;

#if DEBUG
    if ( brParaDebug )
    {
        ss_dtm();
        tprintf( "BrPara Send Master Packet %d for link %04X\n", type, intfPoint );
    }
endif forward_receive( packet );
}

BrParaTransmit( intfPoint )
    FAST INTF_DATA_STR    *intfPoint;
{
    if ( intfPoint->brParaTransmitCount < BRPARA_TRANSMIT_STABLE_COUNT )
    {
        if ( ++intfPoint->brParaTransmitCount >= BRPARA_TRANSMIT_STABLE_COUNT )
        {
            /* everything has stabalized; so we can go to a longer timer */
            intfPoint->brParaTransmitTimeout = BRPARA_LONG_TRANSMIT_TIMEOUT;
        }
    } switch( intfPoint->brParaStateCur )
    {
        case BRPARA_STATE_BAD_TOPOLOGY:
        case BRPARA_STATE_OPERATER_DISABLE:
            break;

case BRPARA_STATE_NO_STABLE:
        case BRPARA_STATE_REMOTE_STABLE:
            /* never send wan data until your local link is stable */
            break;

case BRPARA_STATE_SAME_LAN:
            BrParaWanSend( intfPoint, BRPARA_MSG_WAN_MASTER );
            break;

case BRPARA_STATE_LOCAL_STABLE:
            if ( --(intfPoint->brParaLocalTransmitTimer) == 0 )
            {
                BrParaWanSend( intfPoint, BRPARA_MSG_WAN_MASTER );
                if ( ++(intfPoint->brParaLocalTransmitCount) <= BRPARA_LOCAL_TRANSMIT_COUNT )
                {
                    intfPoint->brParaLocalTransmitTimer = BRPARA_LOCAL_TRANSMIT_SHORT;
                }
                else
                {
                    intfPoint->brParaLocalTransmitTimer = BRPARA_LOCAL_TRANSMIT_LONG;
                    intfPoint->brParaLocalTransmitCount = 0;
                }
            }
            break;

case BRPARA_STATE_BOTH_STABLE:
            /* never should be in this state for long */
            break;

case BRPARA_STATE_SLAVE:
            BrParaWanSend( intfPoint, BRPARA_MSG_WAN_SLAVE );
            if ( stp_id_cmp( &intfPoint->brParaGroupMasterId,
                             &intfPoint->brParaSelf.partner ) == 0 )
                BrParaMasterSend( intfPoint, BRPARA_MSG_SLAVE );
            break;

case BRPARA_STATE_NOT_MASTER_INIT:
        case BRPARA_STATE_NOT_MASTER_WAIT:
        case BRPARA_STATE_NOT_MASTER:
            BrParaWanSend( intfPoint, BRPARA_MSG_WAN_NON_MASTER );
            BrParaNonMasterSend( intfPoint );
            break;

case BRPARA_STATE_MASTER_INIT:
        case BRPARA_STATE_MASTER_WAIT:
        case BRPARA_STATE_MASTER:
        case BRPARA_STATE_MASTER_STOP:
            if ( ++intfPoint->brParaMasterLongTimer >= BRPARA_MASTER_LONG_TIMEOUT )
            {
                BrParaWanSend( intfPoint, BRPARA_MSG_WAN_MASTER_LONG );
                intfPoint->brParaMasterLongTimer = 0;
            }
            else
                BrParaWanSend( intfPoint, BRPARA_MSG_WAN_MASTER );
            BrParaMasterSend( intfPoint, BRPARA_MSG_MASTER );
            break;

case BRPARA_STATE_INIT:
            break;
```

```
                default:
                    crash( CRASH_BRPARA_BAD_STATE );
                    break;
            }
    }

/*********************************************************************
 ********************************************************************
 *****************  Other Calculation Routines  *********************
 ********************************************************************
 *******************************************************************/
GLOBAL VOID
BrParaGivenNewBuckets( intfPoint, buckets )
    FAST INTF_DATA_STR      *intfPoint;
    FAST ULONG              buckets;
{
    FAST UCOUNT             i;
    FAST ULONG              bm;

#if DEBUG
    if ( brParaDebug )
    {
        id_stm();
        dprintf( "BrPara New buckets %04X for link %04X\n", buckets, intfPoint );
    }
endif /* things are unstable so shorten timer and transmit message below */
    intfPoint->brParaTransmitTimeout = BRPARA_SHORT_TRANSMIT_TIMEOUT;
    intfPoint->brParaTransmitCount = 0;

intfPoint->brParaSelf.neighbor.buckets = buckets;
    for ( i = 0, bm = 1; i < BRPARA_BUCKETS; i++, bm <<= 1 )
    {
        intfPoint->brParaBucket[ i ] = ( (bm & buckets) != 0 );
    }

/* transmit changes */
    BrParaTransmit( intfPoint );
}

UTINY   brParaMap[ BRPARA_BUCKETS ] =
{ 0, 16, 8, 24, 4, 20, 12, 28, 2, 18, 10, 26, 6, 22, 14, 30,
  1, 17, 9, 25, 5, 21, 13, 29, 3, 19, 11, 27, 7, 23, 15, 31 };

GLOBAL VOID
BrParaCalcBuckets( intfPoint )
    FAST INTF_DATA_STR      *intfPoint;
{
    FAST UCOUNT             i;
    FAST UCOUNT             bucketIndex;
    FAST UCOUNT             assignedBuckets;
    FAST BRPARA_GROUP_STR   *neighbor;
    FAST ULONG              pathCost;
    FAST ULONG              totalSpeed;
    FAST ULONG              speedPerBucket;
         ULONG              bridgeSpeed[ BRPARA_BUCKETS ];
         ULONG              bucketsForBridge[ BRPARA_BUCKETS ];

/* update master's pathcost */
    block_move( intfPoint->brParaGroupData, &intfPoint->brParaSelf,
                sizeof(BRPARA_GROUP_STR) );

/* zero out the link speeds */
    for ( i = 0; i < BRPARA_BUCKETS; i++ )
    {
        bridgeSpeed[ i ] = 0;
        intfPoint->brParaGroupData[ i ].neighbor.buckets = 0; /* just to be safe */
    }

/* calc bridge speed for each bridge */
    totalSpeed = 0;
    for ( i = 0; i < intfPoint->brParaGroupNumEntries; i++ )
    {
        neighbor = &intfPoint->brParaGroupData[i];
        pathCost = (neighbor->neighbor.pathCost + neighbor->partner.pathCost) / 2;
        totalSpeed += bridgeSpeed[ i ] = 1000000000 / pathCost;
    } if ( totalSpeed == 0 )
        totalSpeed = 1; /* can't divide by zero later */ speedPerBucket = totalSpeed / BRPARA_BUCKETS;
```

```
    /* give out buckets */
    assignedBuckets = 0;
    if ( speedPerBucket == 0 )
    {
        for ( i = 0; i < BRPARA_BUCKETS; i++ )
            bucketsForBridge[ i ] = 0;
    }
    else
    {
        for ( i = 0; i < BRPARA_BUCKETS; i++ )
        {
            if ( bridgeSpeed [ i ] == 0 )
                bucketsForBridge[ i ] = 0;
            else
            {
                bucketsForBridge[ i ] = bridgeSpeed[ i ] / speedPerBucket;
                bridgeSpeed[ i ] -= ( bucketsForBridge[ i ] * speedPerBucket );
                assignedBuckets += bucketsForBridge[ i ];
                bucketIndex = i;
            }
        }
    }

/* give out unsigned buckets */
    for ( ; assignedBuckets < BRPARA_BUCKETS; assignedBuckets++ )
    {
        /* give to the one with largest remainder */
        for ( i = 0; i < BRPARA_BUCKETS; i++ )

if ( bridgeSpeed[ i ] > bridgeSpeed[ bucketIndex ] )
                bucketIndex = i;

bucketsForBridge[ bucketIndex ]++;
        bridgeSpeed[ bucketIndex ] = 0;
    }

/* now assign the buckets */
    bucketIndex = 0;
    for ( i = 0; i < BRPARA_BUCKETS; i++ )
    {
        neighbor = &(intfPoint->brParaGroupData[i]);
        for( ; bucketsForBridge[ i ]-- > 0; )

neighbor->neighbor.buckets |= 1 << brParaMap[ bucketIndex++ ];

neighbor->partner.timer = TRUE;
    }
    intfPoint->brParaSelf.partner.timer = TRUE;
    BrParaGivenNewBuckets( intfPoint,
                           intfPoint->brParaGroupData[0].neighbor.buckets );

/* now assign the new pathcost */
    pathCost = 100000000 / totalSpeed;
    if ( pathCost == 0 )
        pathCost = 1;
    intfPoint->brParaFairPathCost = pathCost;
    BrParaSetStpPathCost( intfPoint );
}
BrParaClearBuckets( intfPoint )
    FAST INTF_DATA_STR  *intfPoint;
{
    FAST UCOUNT             i;
    FAST BRPARA_GROUP_STR   *neighbor;

#if DEBUG
    if ( brParaDebug )
    {
        cp_dtm();
        cprintf( "BrPara clear buckets for link %04X\n", intfPoint );
    }
endif /* reset the partner and all the neighbor timers */
    intfPoint->brParaSelf.partner.timer = TRUE;
    BrParaGivenNewBuckets( intfPoint, 0 );

for ( i = 1, neighbor = intfPoint->brParaGroupData + 1;
          i < intfPoint->brParaGroupNumEntries; i++, neighbor++ )
    {
```

```
            neighbor->partner.timer = TRUE;
            neighbor->neighbor.buckets = 0;
    }
}

GLOBAL VOID
BrParaSerActive( intfPoint, active )
    FAST INTF_DATA_STR  *intfPoint;
    FAST BOOLEAN        active;
{
    FAST INTF_DATA_STR  *wanpoint;
    FAST UCOUNT         i;

intfPoint->brParaActive = active;

for ( i = base_wan; i < base_wan + ci.max_wan; i++ )
    {
        wanpoint = intfTblPtrs[ i ];

if ( !wanpoint->work.inUse )
            continue;

wanpoint->brParaActive = active;
    }
}

/******************************************************************
 *******************************************************************
 *************** State Routines ************************************
 *******************************************************************
 ******************************************************************/

GLOBAL VOID
BrParaStateMachine( intfPoint )
    FAST INTF_DATA_STR  *intfPoint;
{
    FAST BOOLEAN    active;

while ( intfPoint->brParaStateNew != intfPoint->brParaStateCur )
    { if DEBUG
        if ( brParaDebug )
        {
            do_dtm();
            dprintf( "BrPara New State %d Old State %d for link %04X\n",
                     intfPoint->brParaStateNew, intfPoint->brParaStateCur, intfPoint );
        }
endif intfPoint->brParaStateCur = intfPoint->brParaStateNew;
        intfPoint->brParaStableTime = elapsed_time;
        /* things are unstable so shorten timer */
        intfPoint->brParaTransmitTimeout = BRPARA_SHORT_TRANSMIT_TIMEOUT;
        intfPoint->brParaTransmitCount = 0;

switch( intfPoint->brParaStateNew )
        {
            case BRPARA_STATE_BAD_TOPOLOGY:
            case BRPARA_STATE_OPERATER_DISABLE:
                active = FALSE;
                intfPoint->brParaGroupNumEntries = 0; /* we have no entries anymore */
                intfPoint->brParaSelf.neighbor.timer = BRPARA_TIMER_INACTIVE;
                intfPoint->brParaMasterTimer = BRPARA_TIMER_INACTIVE;
                intfPoint->brParaBucketTimer = BRPARA_TIMER_INACTIVE;
                break;

case BRPARA_STATE_SAME_LAN:
                active = FALSE;
                intfPoint->brParaGroupNumEntries = 0; /* we have no entries anymore */
                intfPoint->brParaSelf.neighbor.timer = 0;
                intfPoint->brParaMasterTimer = BRPARA_TIMER_INACTIVE;
                intfPoint->brParaBucketTimer = BRPARA_TIMER_INACTIVE;
                break;

case BRPARA_STATE_NO_STABLE:
                active = FALSE;
                intfPoint->brParaGroupNumEntries = 0; /* we have no entries anymore */
                intfPoint->brParaRemoteLanId.priority = -1; /* set to noone */
                intfPoint->brParaLanState = BRPARA_LAN_UNSTABLE;
```

```
        if ( LanNamePoll( intfPoint->link ) )
            BrParaLanStable( intfPoint );
        /* disable all timers */
        intfPoint->brParaSelf.neighbor.timer = BRPARA_TIMER_INACTIVE;
        intfPoint->brParaMasterTimer = BRPARA_TIMER_INACTIVE;
        intfPoint->brParaBucketTimer = BRPARA_TIMER_INACTIVE;
        break;

case BRPARA_STATE_REMOTE_STABLE:
        active = FALSE;
        intfPoint->brParaGroupNumEntries = 0; /* we have no entries anymore */
        intfPoint->brParaSelf.neighbor.timer = BRPARA_TIMER_INACTIVE;
        intfPoint->brParaMasterTimer = BRPARA_TIMER_INACTIVE;
        intfPoint->brParaBucketTimer = BRPARA_TIMER_INACTIVE;
        break;

case BRPARA_STATE_LOCAL_STABLE:
        active = FALSE;
        intfPoint->brParaGroupNumEntries = 0; /* we have no entries anymore */
        BrParaWanSend( intfPoint, BRPARA_MSG_WAN_MASTER );
        intfPoint->brParaSelf.neighbor.timer = BRPARA_TIMER_INACTIVE;
        intfPoint->brParaMasterTimer = BRPARA_TIMER_INACTIVE;
        intfPoint->brParaBucketTimer = BRPARA_TIMER_INACTIVE;
        intfPoint->brParaLocalTransmitCount = 0;
        intfPoint->brParaLocalTransmitTimer = BRPARA_LOCAL_TRANSMIT_SHORT;
        break;

case BRPARA_STATE_BOTH_STABLE:
        active = FALSE;
        if ( stp_id_cmp( &intfPoint->brParaRemoteLanId,
                         &intfPoint->brParaLocalLanId ) == 0 )
        {
            intfPoint->brParaStateNew = BRPARA_STATE_SAME_LAN;
        }
        else
        {
            stp_id_cpy( &intfPoint->brParaGroupMasterId,
                        &intfPoint->brParaSelf.neighbor.id );
            intfPoint->brParaGroupMasterIdFrom = LOCAL_LINK;
            intfPoint->brParaStateNew = BRPARA_STATE_MASTER_INIT;
        }
        break;

case BRPARA_STATE_SLAVE:
        active = TRUE;
        intfPoint->brParaGroupNumEntries = 0; /* we have no entries anymore;
                                                 waiting for msg from master */
        intfPoint->brParaSelf.neighbor.timer = 0;
        intfPoint->brParaMasterTimer = BRPARA_TIMER_INACTIVE;
        intfPoint->brParaBucketTimer = BRPARA_TIMER_INACTIVE;
        intfPoint->brParaChanges++;
        break;

case BRPARA_STATE_NOT_MASTER_INIT:
        active = TRUE;
        BrParaGivenNewBuckets( intfPoint, 0 );
        BrParaNewPairPathCost( intfPoint );
        intfPoint->brParaSelf.partner.buckets = 0;
        intfPoint->brParaSelf.neighbor.timer = 0;
        intfPoint->brParaSelf.partner.timer = TRUE;
        intfPoint->brParaMasterTimer = 0;
        intfPoint->brParaBucketTimer = BRPARA_TIMER_INACTIVE;
        intfPoint->brParaStateNew = BRPARA_STATE_NOT_MASTER_WAIT;
        BrParaTransmit( intfPoint );
        break;

case BRPARA_STATE_NOT_MASTER:
        intfPoint->brParaChanges++;
        /* fall through */
    case BRPARA_STATE_NOT_MASTER_WAIT:
        active = TRUE;
        break;

case BRPARA_STATE_MASTER_INIT:
        active = TRUE;
        BrParaCalcPathcost( intfPoint );
        intfPoint->brParaGroupNumEntries = 1; /* we have our own entry */
        BrParaGivenNewBuckets( intfPoint, 0 );
        intfPoint->brParaSelf.partner.buckets = 0;
        intfPoint->brParaSelf.neighbor.timer = 0;
        intfPoint->brParaMasterTimer = BRPARA_TIMER_INACTIVE;
        intfPoint->brParaMasterLongTimer = BRPARA_MASTER_LONG_TIMEOUT;
        intfPoint->brParaBucketTimer = 0;
        intfPoint->brParaStateNew = BRPARA_STATE_MASTER_STOP;
```

```
                    BrParaSetStpState( intfPoint );
                    BrParaTransmit( intfPoint );
                    break;

case BRPARA_STATE_MASTER_WAIT:
                    active = TRUE;
                    /* calculate which links get which buckets */
                    BrParaCalcBuckets( intfPoint );
                    break;

case BRPARA_STATE_MASTER:
                    intfPoint->brParaChanges++;
                    active = TRUE;
                    break;

case BRPARA_STATE_MASTER_STOP:
                    active = TRUE;
                    BrParaClearBuckets( intfPoint );
                    break;

default:
                    crash( CRASH_BRPARA_BAD_STATE );
                    break;
                } if ( active != intfPoint->brParaActive )
            {
                BrParaSetActive( intfPoint, active );
                stp_notify( intfPoint->assignedIntf );
                BrParaSetStpPathCost( intfPoint );
            }
        }
}

GLOBAL VOID
BrParaNewPartner( intfPoint, partner, remoteLan )
    FAST INTF_DATA_STR      *intfPoint;
    FAST BRPARA_BRIDGE_STR  *partner;
    FAST STP_IDENTIFIER     *remoteLan;
{ if DEBUG
    if ( brParaDebug || brParaDebug2 )
    {
        io_ctm();
        d_printf( "BrPara New partner %02X-%02X-%02X-%02X for link %04X\n",
                partner->id.priority, partner->id.id.high,
                partner->id.id.middle, partner->id.id.low, intfPoint );
    }
endif stp_id_cpy( &intfPoint->brParaSelf.partner.id, &partner->id );
    intfPoint->brParaSelf.partner.state    = partner->state;
    intfPoint->brParaSelf.partner.pathCost = partner->pathCost;
    intfPoint->brParaSelf.partner.buckets  = partner->buckets;
    stp_ic_cpy( &intfPoint->brParaRemoteLanId, remoteLan );

switch( intfPoint->brParaStateCur )
    {
        case BRPARA_STATE_INIT:
        case BRPARA_STATE_BAD_TOPOLOGY:
        case BRPARA_STATE_SAME_LAN:
        case BRPARA_STATE_OPERATER_DISABLE:
        case BRPARA_STATE_REMOTE_STABLE:
            break;

case BRPARA_STATE_NO_STABLE:
            intfPoint->brParaStateNew = BRPARA_STATE_REMOTE_STABLE;
            process_signal( intfPoint->brParaFcb, SIG_WAKEUP );
            break;

case BRPARA_STATE_LOCAL_STABLE:
        case BRPARA_STATE_BOTH_STABLE:
        case BRPARA_STATE_SLAVE:
        case BRPARA_STATE_NOT_MASTER_INIT:
        case BRPARA_STATE_NOT_MASTER_WAIT:
        case BRPARA_STATE_NOT_MASTER:
        case BRPARA_STATE_MASTER_INIT:
        case BRPARA_STATE_MASTER_WAIT:
        case BRPARA_STATE_MASTER:
```

```
        case BRPARA_STATE_MASTER_STOP:
            intfPoint->brParaStateNew = BRPARA_STATE_BOTH_STABLE;
            process_signal( intfPoint->brParaFcb, SIG_WAKEUP );
            break;

default:
            crash( CRASH_BRPARA_BAD_STATE );
            break;
        }
}

GLOBAL VOID
BrParaNewPartnerRemoteLan( intfPoint, remoteLan )
    FAST INTF_DATA_STR      *intfPoint;
    FAST STP_IDENTIFIER     *remoteLan;
{ if DEBUG
    if ( brParaDebug || brParaDebug2 )
    {
        co_dtm();
        dprintf( "BrPara New partner remote lan for link %04X\n", intfPoint );
    }
endif stp_id_cpy( &intfPoint->brParaRemoteLanId, remoteLan );

switch( intfPoint->brParaStateCur )
    {
        case BRPARA_STATE_INIT:
        case BRPARA_STATE_BAD_TOPOLOGY:
        case BRPARA_STATE_OPERATER_DISABLE:
        case BRPARA_STATE_REMOTE_STABLE:
            break;

case BRPARA_STATE_NO_STABLE:
            intfPoint->brParaStateNew = BRPARA_STATE_REMOTE_STABLE;
            process_signal( intfPoint->brParaFcb, SIG_WAKEUP );
            break;

case BRPARA_STATE_SAME_LAN:
        case BRPARA_STATE_LOCAL_STABLE:
        case BRPARA_STATE_BOTH_STABLE:
        case BRPARA_STATE_SLAVE:
        case BRPARA_STATE_NOT_MASTER_INIT:
        case BRPARA_STATE_NOT_MASTER_WAIT:
        case BRPARA_STATE_NOT_MASTER:
        case BRPARA_STATE_MASTER_INIT:
        case BRPARA_STATE_MASTER_WAIT:
        case BRPARA_STATE_MASTER:
        case BRPARA_STATE_MASTER_STOP:
            intfPoint->brParaStateNew = BRPARA_STATE_BOTH_STABLE;
            process_signal( intfPoint->brParaFcb, SIG_WAKEUP );
            break;

default:
            crash( CRASH_BRPARA_BAD_STATE );
            break;
        }
}

GLOBAL VOID
BrParaWanBetterMaster( intfPoint, groupMaster )
    FAST INTF_DATA_STR      *intfPoint;
    FAST STP_IDENTIFIER     *groupMaster;
{ if DEBUG
    if ( brParaDebug )
    {
        co_dtm();
        dprintf( "BrPara Better wan master for link %04X\n", intfPoint );
    }
endif stp_id_cpy( &intfPoint->brParaGroupMasterId, groupMaster );
    intfPoint->brParaGroupMasterIdFrom = WAN_LINK;

switch( intfPoint->brParaStateCur )
    {
```

```
        case BRPARA_STATE_INIT:
        case BRPARA_STATE_BAD_TOPOLOGY:
        case BRPARA_STATE_SAME_LAN:
        case BRPARA_STATE_OPERATER_DISABLE:
        case BRPARA_STATE_REMOTE_STABLE:
        case BRPARA_STATE_NO_STABLE:
        case BRPARA_STATE_LOCAL_STABLE:
        case BRPARA_STATE_BOTH_STABLE:
            break;

case BRPARA_STATE_SLAVE:
            break;

case BRPARA_STATE_NOT_MASTER_INIT:
        case BRPARA_STATE_NOT_MASTER_WAIT:
        case BRPARA_STATE_NOT_MASTER:
        case BRPARA_STATE_MASTER_INIT:
        case BRPARA_STATE_MASTER_WAIT:
        case BRPARA_STATE_MASTER:
        case BRPARA_STATE_MASTER_STOP:
            intfPoint->brParaStateNew = BRPARA_STATE_SLAVE;
            process_signal( intfPoint->brParaPcb, SIG_WAKEUP );
            break;

default:
            crash( CRASH_BRPARA_BAD_STATE );
            break;
        }
}

GLOBAL VOID
BrParaWanWorseMaster( intfPoint, groupMaster )
    FAST INTF_DATA_STR      *intfPoint;
    FAST STP_IDENTIFIER     *groupMaster;
{ if DEBUG
    if ( brParaDebug || brParaDebug2 )
    {
        do_stm();
        printf( "BrPara worse wan master for link %04X\n", intfPoint );
    }
endif switch( intfPoint->brParaStateCur )
    {
        case BRPARA_STATE_INIT:
        case BRPARA_STATE_BAD_TOPOLOGY:
        case BRPARA_STATE_SAME_LAN:
        case BRPARA_STATE_OPERATER_DISABLE:
        case BRPARA_STATE_REMOTE_STABLE:
        case BRPARA_STATE_NO_STABLE:
        case BRPARA_STATE_LOCAL_STABLE:
        case BRPARA_STATE_BOTH_STABLE:
            if ( intfPoint->brParaGroupMasterIdFrom == WAN_LINK )
            {
                /* if we are not better than the worse id keep it */
                if ( stp_id_cmp( groupMaster, &intfPoint->brParaSelf.neighbor.id ) == -1 )
                    stp_id_cpy( &intfPoint->brParaGroupMasterId, groupMaster );
                else
                    stp_id_cpy( &intfPoint->brParaGroupMasterId,
                                &intfPoint->brParaSelf.neighbor.id );
            }
            break;

case BRPARA_STATE_SLAVE:
            if ( stp_id_cmp( groupMaster, &intfPoint->brParaSelf.neighbor.id ) == -1 )
            {
                stp_id_cpy( &intfPoint->brParaGroupMasterId, groupMaster );
                intfPoint->brParaGroupMasterIdFrom = WAN_LINK;
            }
            else
            {
                intfPoint->brParaStateNew = BRPARA_STATE_BOTH_STABLE;
            }
            break;

case BRPARA_STATE_NOT_MASTER_INIT:
        case BRPARA_STATE_NOT_MASTER_WAIT:
        case BRPARA_STATE_NOT_MASTER:
```

```
        case BRPARA_STATE_MASTER_INIT:
        case BRPARA_STATE_MASTER_WAIT:
        case BRPARA_STATE_MASTER:
        case BRPARA_STATE_MASTER_STOP:
            break;

default:
            crash( CRASH_BRPARA_BAD_STATE );
            break;
        }
}

GLOBAL VOID
BrParaMasterData( intfPoint, msg )
    FAST INTF_DATA_STR      *intfPoint;
    FAST BRPARA_MSG_STR     *msg;
{
    FAST UCOUNT             i;
    FAST BRPARA_GROUP_STR   *neighbor;

/* copy data to buffer */ if MICROTEC
    block_move( intfPoint->brParaGroupData, (UTINY *) &msg->msg.master + sizeof(msg->msg.master),
                sizeof( BRPARA_GROUP_STR ) * BRPARA_BUCKETS );
#else
    block_move( intfPoint->brParaGroupData, msg->msg.master.groups,
                sizeof( BRPARA_GROUP_STR ) * BRPARA_BUCKETS );
#endif
    intfPoint->brParaGroupNumEntries = msg->msg.master.groupSize;

/* if from master save forward state to be used */
    intfPoint->brParaMasterStpState = msg->msg.master.stpState;
    BrParaSetStpState( intfPoint );

/* now look for us in this group */
    for ( i = 1, neighbor = intfPoint->brParaGroupData + 1;
          i < intfPoint->brParaGroupNumEntries; i++, neighbor++ )
    {
        if ( stp_id_cmp( &neighbor->neighbor.id,
                         &intfPoint->brParaSelf.neighbor.id ) == 0 )
        {
if DEBUG
            if ( brParaDebug )
            {
                do_dtm();
                dprintf( "BrPara Master with us for link %04X\n", intfPoint );
            }
endif
            /* see if instructions changed */
            if ( neighbor->neighbor.buckets != intfPoint->brParaSelf.neighbor.buckets )
            {
                BrParaGivenNewBuckets( intfPoint, neighbor->neighbor.buckets );
                BrParaNonMasterSend( intfPoint );
            }

/* found entry so exit */
            break;
        }
    } if ( i == intfPoint->brParaGroupNumEntries )
    {
        if ( intfPoint->brParaGroupNumEntries == BRPARA_BUCKETS )
#if DEBUG
            if ( brParaDebug )
            {
                do_dtm();
                dprintf( "BrPara Master without us for link %04X\n", intfPoint );
            }
endif
        else
#if DEBUG
            if ( brParaDebug )
            {
                do_dtm();
                dprintf( "BrPara Master %d missing us for link %04X\n",
                         msg->msg.master.groupSize, intfPoint );
            }
endif
            BrParaNonMasterSend( intfPoint );
    }
}
```

```
GLOBAL VOID
BrParaLanBetterMaster( intfPoint, msg )
    FAST INTF_DATA_STR    *intfPoint;
    FAST BRPARA_MSG_STR   *msg;
{ if DEBUG
    if ( brParaDebug )
    {
        cc_dtm();
        cprintf( "BrPara Better Lan master for link %04X\n", intfPoint );
    }
endif stp_ic_cpy( &intfPoint->brParaGroupMasterId,
                &msg->msg.master.groupMasterId );
    intfPoint->brParaGroupMasterIdFrom = LAN_LINK;

switch( intfPoint->brParaStateCur )
    {
        case BRPARA_STATE_INIT:
        case BRPARA_STATE_BAD_TOPOLOGY:
        case BRPARA_STATE_SAME_LAN:
        case BRPARA_STATE_OPERATER_DISABLE:
        case BRPARA_STATE_REMOTE_STABLE:
        case BRPARA_STATE_NO_STABLE:
        case BRPARA_STATE_LOCAL_STABLE:
        case BRPARA_STATE_BOTH_STABLE:
            break;

case BRPARA_STATE_SLAVE:
        case BRPARA_STATE_NOT_MASTER_INIT:
        case BRPARA_STATE_NOT_MASTER_WAIT:
        case BRPARA_STATE_NOT_MASTER:
        case BRPARA_STATE_MASTER_INIT:
        case BRPARA_STATE_MASTER_WAIT:
        case BRPARA_STATE_MASTER:
        case BRPARA_STATE_MASTER_STOP:
            BrParaMasterData( intfPoint, msg );
            intfPoint->brParaStateNew = BRPARA_STATE_NOT_MASTER_INIT;
            process_signal( intfPoint->brParaPcb, SIG_WAKEUP );
            break;

default:
            crash( CRASH_BRPARA_BAD_STATE );
            break;
    }
}

GLOBAL VOID
BrParaSameMaster( intfPoint, msg )
    FAST INTF_DATA_STR    *intfPoint;
    FAST BRPARA_MSG_STR   *msg;
{
    FAST LCOUNT           i;
    FAST BRPARA_GROUP_STR *neighbor;

#if DEBUG
    if ( brParaDebug )
    {
        cc_dtm();
        cprintf( "BrPara Same Lan master for link %04X\n", intfPoint );
    }
endif switch( intfPoint->brParaStateCur )
    {
        case BRPARA_STATE_INIT:
        case BRPARA_STATE_BAD_TOPOLOGY:
        case BRPARA_STATE_SAME_LAN:
        case BRPARA_STATE_OPERATER_DISABLE:
        case BRPARA_STATE_REMOTE_STABLE:
        case BRPARA_STATE_NO_STABLE:
        case BRPARA_STATE_LOCAL_STABLE:
        case BRPARA_STATE_BOTH_STABLE:
            break;

case BRPARA_STATE_NOT_MASTER_INIT:
        case BRPARA_STATE_NOT_MASTER_WAIT:
        case BRPARA_STATE_NOT_MASTER:
```

```
            intfPoint->brParaMasterTimer = 0;
            BrParaMasterData( intfPoint, msg );
            break;

case BRPARA_STATE_SLAVE:
            if ( intfPoint->brParaGroupMasterIdFrom == WAN_LINK )
            {
                /* lan link has precedence over wan link */
                intfPoint->brParaGroupMasterIdFrom = LAN_LINK;
                BrParaMasterData( intfPoint, msg );
                intfPoint->brParaStateNew = BRPARA_STATE_NOT_MASTER_INIT;
                process_signal( intfPoint->brParaPcb, SIG_WAKEUP );
                break;
            }
            /* fall through to crash */
        case BRPARA_STATE_MASTER_INIT:
        case BRPARA_STATE_MASTER_WAIT:
        case BRPARA_STATE_MASTER:
        case BRPARA_STATE_MASTER_STOP:
        default:
            crash( CRASH_BRPARA_BAD_STATE );
            break;
        }
}

GLOBAL VOID
BrParaNeighborSynched( intfPoint, neighbor )
    FAST INTF_DATA_STR      *intfPoint;
    FAST BRPARA_GROUP_STR   *neighbor;
{
    FAST BRPARA_GROUP_STR   *tmpNeighbor;
    FAST UCOUNT             i;

#if DEBUG
    if ( brParaDebug )
    {
        co_dtm();
        co_printf( "BrPara Neighbor Synch for link %04X\n", intfPoint );
    }
endif if ( neighbor != NULL )
        neighbor->partner.timer = FALSE;

if ( intfPoint->brParaSelf.partner.timer != FALSE )
        return;

for ( i = 1, tmpNeighbor = intfPoint->brParaGroupData + 1;
          i < intfPoint->brParaGroupNumEntries; i++, tmpNeighbor++ )
    {
        if ( tmpNeighbor->partner.timer != FALSE )
            return;
    }

/* we may now be able to transition */
    if ( intfPoint->brParaStateCur == BRPARA_STATE_MASTER_WAIT )
    {
        intfPoint->brParaStateNew = BRPARA_STATE_MASTER;
        process_signal( intfPoint->brParaPcb, SIG_WAKEUP );
    }
    else if ( intfPoint->brParaStateCur == BRPARA_STATE_MASTER_STOP &&
              intfPoint->brParaSelf.partner.timer == FALSE )
    {
        intfPoint->brParaStateNew = BRPARA_STATE_MASTER_WAIT;
        process_signal( intfPoint->brParaPcb, SIG_WAKEUP );
    }
}

GLOBAL VOID
BrParaNewNeighbor( intfPoint, neighbor )
    FAST INTF_DATA_STR      *intfPoint;
    FAST BRPARA_GROUP_STR   *neighbor;
{
    FAST BRPARA_GROUP_STR   *tmpNeighbor;

#if DEBUG
    if ( brParaDebug || brParaDebug2 )
    {
        co_dtm();
        co_printf( "BrPara Perform new neighbor for link %04X\n", intfPoint );
    }
```

```
#endif
    tmpNeighbor = &intfPoint->brParaGroupData[ intfPoint->brParaGroupNumEntries++ ];
    block_move( tmpNeighbor, neighbor, sizeof( BRPARA_GROUP_STR ) );
    tmpNeighbor->neighbor.timer = 0;
    BrParaNewLoadBalance( intfPoint );
}

GLOBAL VOID
BrParaNeighborData( intfPoint, msg )
    FAST INTF_DATA_STR      *intfPoint;
    FAST BRPARA_MSG_STR     *msg;
{
    FAST LCOUNT             i;
    FAST BRPARA_GROUP_STR   *neighbor;

switch( intfPoint->brParaStateCur )
    {
        case BRPARA_STATE_INIT:
        case BRPARA_STATE_BAD_TOPOLOGY:
        case BRPARA_STATE_SAME_LAN:
        case BRPARA_STATE_OPERATER_DISABLE:
        case BRPARA_STATE_REMOTE_STABLE:
        case BRPARA_STATE_NO_STABLE:
        case BRPARA_STATE_LOCAL_STABLE:
        case BRPARA_STATE_BOTH_STABLE:
        case BRPARA_STATE_SLAVE:
        case BRPARA_STATE_NOT_MASTER_INIT:
        case BRPARA_STATE_NOT_MASTER_WAIT:
        case BRPARA_STATE_NOT_MASTER:
            break;

case BRPARA_STATE_MASTER_INIT:
        case BRPARA_STATE_MASTER_WAIT:
        case BRPARA_STATE_MASTER:
        case BRPARA_STATE_MASTER_STOP:
            /* now look for us in this group */
            for ( i = 1, neighbor = intfPoint->brParaGroupData + 1;
                    i < intfPoint->brParaGroupNumEntries; i++, neighbor++ )
            {
                if ( stp_id_cmp( &neighbor->neighbor.id,
                                 &msg->msg.nonMaster.self.neighbor.id ) == 0 &&
                     stp_id_cmp( &neighbor->partner.id,
                                 &msg->msg.nonMaster.self.partner.id ) == 0 )
                {
if DEBUG
                    if ( brParaDebug )
                    {
                        do_dtm();
                        dprintf( "BrPara Neighbor Found for link %04X\n", intfPoint );
                    }
endif
                    /* we have seen group so reset counter */
                    neighbor->neighbor.timer = 0;
                    /* update state information */
                    neighbor->neighbor.state = msg->msg.nonMaster.self.neighbor.state;
                    neighbor->partner.state = msg->msg.nonMaster.self.partner.state;
                    neighbor->partner.buckets = msg->msg.nonMaster.self.partner.buckets;

/* see if instructions changed */
                    if ( neighbor->neighbor.buckets == msg->msg.nonMaster.self.neighbor.buckets &&
                         neighbor->neighbor.buckets == msg->msg.nonMaster.self.partner.buckets &&
                         neighbor->partner.timer )
                    {
if DEBUG
                        if ( brParaDebug )
                        {
                            do_dtm();
                            dprintf( "BrPara Neighbor Ok for link %04X\n", intfPoint );
                        }
endif
                        BrParaNeighborSynched( intfPoint, neighbor );
                    }
                    else
                    {
if DEBUG
                        if ( brParaDebug )
                        {
                            do_dtm();
                            dprintf( "BrPara Neighbor not up to date for link %04X\n", intfPoint );
                        }
endif
                    }
                    if ( neighbor->neighbor.pathCost != msg->msg.nonMaster.self.neighbor.pathCost ||
                         neighbor->partner.pathCost != msg->msg.nonMaster.self.partner.pathCost )
                    {
if DEBUG
                        if ( brParaDebug || brParaDebug2 )
                        {
```

```
                    do_dtm();
                    dprintf( "BrPara Neighbor new pathcosts: %d, partner: %d for link %04X\n",
                            msg->msg.nonMaster.self.neighbor.pathCost,
                            msg->msg.nonMaster.self.partner.pathCost, intfPoint );
                    }
endif
                    neighbor->neighbor.pathCost = msg->msg.nonMaster.self.neighbor.pathCost;
                    neighbor->partner.pathCost = msg->msg.nonMaster.self.partner.pathCost;
                    BrParaNewLoadBalance( intfPoint );
                    }
                break;
                }
            }

/* check to see if entry not found */
            if ( ( i >= intfPoint->brParaGroupNumEntries &&
                   intfPoint->brParaGroupNumEntries != BRPARA_BUCKETS ).
            {
if DEBUG
                if ( brParaDebug )
                    {
                    do_dtm();
                    dprintf( "BrPara Neighbor Not Found for link %04X\n", intfPoint );
                    }
endif
                BrParaNewNeighbor( intfPoint, &msg->msg.nonMaster.self );
                }
            break;

default:
            crash( CRASH_BRPARA_BAD_STATE );
            break;
        }
    }

GLOBAL VOID
BrParaSlaveData( intfPoint, msg )
    FAST INTF_DATA_STR      *intfPoint;
    FAST BRPARA_MSG_STR     *msg;
    {
    if ( intfPoint->brParaStateCur == BRPARA_STATE_SLAVE )
        {
        /* copy data to buffer */
if MICROTEC
        block_move( intfPoint->brParaGroupData, (UTINY *) &msg->msg.master + sizeof(msg->msg.master),
                   sizeof( BRPARA_GROUP_STR ) * BRPARA_BUCKETS );
#else
        block_move( intfPoint->brParaGroupData, msg->msg.master.groups,
                   sizeof( BRPARA_GROUP_STR ) * BRPARA_BUCKETS );
#endif
        intfPoint->brParaGroupNumEntries = msg->msg.master.groupSize;
        }
    }

GLOBAL VOID
BrParaWanMasterData( intfPoint, msg )
    FAST INTF_DATA_STR      *intfPoint;
    FAST BRPARA_MSG_STR     *msg;
    {
    if ( intfPoint->brParaStateCur == BRPARA_STATE_SLAVE )
        {
        /* copy data to buffer */
if MICROTEC
        block_move( intfPoint->brParaGroupData, (UTINY *) &msg->msg.wan + sizeof(msg->msg.wan),
                   sizeof( BRPARA_GROUP_STR ) * BRPARA_BUCKETS );
#else
        block_move( intfPoint->brParaGroupData, msg->msg.wan.groups,
                   sizeof( BRPARA_GROUP_STR ) * BRPARA_BUCKETS );
#endif
        intfPoint->brParaGroupNumEntries = msg->msg.wan.groupSize;
        }
    }

GLOBAL VOID
BrParaWanSlave( intfPoint, msg, pathCostChange )
    FAST INTF_DATA_STR      *intfPoint;
    FAST BRPARA_MSG_STR     *msg;
    FAST BOOLEAN            pathCostChange;
    {
    switch( intfPoint->brParaStateCur )
        {
        case BRPARA_STATE_MASTER_INIT:
        case BRPARA_STATE_MASTER_WAIT:
        case BRPARA_STATE_MASTER:
        case BRPARA_STATE_MASTER_STOP:
```

```
            intfPoint->brParaMasterStpState = msg->msg.wan.stpState;
            BrParaSetStpState( intfPoint );
            break;
    } if ( pathCostChange )
    {
        BrParaNewPairPathCost( intfPoint );
    } if ( intfPoint->brParaSelf.neighbor.buckets == msg->msg.wan.self.buckets &&
         intfPoint->brParaSelf.partner.timer )
    {
        intfPoint->brParaSelf.partner.timer = FALSE;

if ( intfPoint->brParaStateCur == BRPARA_STATE_NOT_MASTER_WAIT )
        {
            intfPoint->brParaStateNew = BRPARA_STATE_NOT_MASTER;
            process_signal( intfPoint->brParaPcb, SIG_WAKEUP );
        }
        else if ( intfPoint->brParaStateCur == BRPARA_STATE_MASTER_WAIT ||
                  intfPoint->brParaStateCur == BRPARA_STATE_MASTER_STOP )
            BrParaNeighborSynched( intfPoint, NULL );
    }
}

GLOBAL VOID
BrParaPartnerData( intfPoint, msg )
    FAST INTF_DATA_STR      *intfPoint;
    FAST BRPARA_MSG_STR     *msg;
{ if ( intfPoint->brParaStateCur == BRPARA_STATE_SLAVE )
    {
        /* if from master save forward state for display purposes */
        intfPoint->brParaMasterStpState = msg->msg.wan.stpState;
        BrParaSetStpState( intfPoint );

/* deal with a change in the pairPathcost */
        if ( msg->msg.wan.pairPathCost != intfPoint->brParaPairPathCost )
        {
            intfPoint->brParaPairPathCost = msg->msg.wan.pairPathCost;
            BrParaNewPairPathCost( intfPoint );
        }
        /* see if instructions changed */
        if ( msg->msg.wan.self.buckets != intfPoint->brParaSelf.neighbor.buckets )
#if DEBUG
            if ( brParaDebug )
            {
                do_dtr();
                dprintf( "Partner data for link %04X\n", intfPoint );
            }
endif
            BrParaGivenNewBuckets( intfPoint, msg->msg.wan.self.buckets );
            BrParaWanSend( intfPoint, BRPARA_MSG_WAN_SLAVE );
    }
}

/***************************************************************
 *****************************************************************
 ****************** Packet Handling Routines *********************
 *****************************************************************
 ***************************************************************/

GLOBAL VOID
BrParaHandlePacket( intfPoint, packet )
    FAST INTF_DATA_STR      *intfPoint;
    FAST PACKET_STR         *packet;
{
    FAST BRPARA_MSG_STR     *msg;
    FAST LONG               cmp;
    FAST BOOLEAN            pathCostChange;

msg = (BRPARA_MSG_STR *) packet->ptr;

/* pre packet validation */
    switch ( msg->hdr.type )
    {
        case BRPARA_MSG_MASTER:
        case BRPARA_MSG_SLAVE:
            /* check if not same remote lan then not for us */
            if ( stp_id_cmp_nz( &msg->msg.master.remoteLanId, &intfPoint->brParaRemoteLanId ) != 0 )
            {
```

```
            /* if this is from our master */
            if ( stp_id_cmp_nz( &msg->msg.master.groupMasterId, &intfPoint->brParaGroupMasterId )
            {
                intfPoint->brParaStateNew = BRPARA_STATE_BOTH_STABLE;
                process_signal( intfPoint->brParaPcb, SIG_WAKEUP );
                goto brParaNextState;
            }
            goto brParaPacketFree;
        }
        break;

case BRPARA_MSG_NON_MASTER:
        /* check if not same remote lan then not for us */
        if ( stp_id_cmp_nz( &msg->msg.nonMaster.remoteLanId, &intfPoint->brParaRemoteLanId ) != 0
            goto brParaPacketFree;
        break;

case BRPARA_MSG_WAN_MASTER_LONG:
    case BRPARA_MSG_WAN_MASTER:
    case BRPARA_MSG_WAN_SLAVE:
    case BRPARA_MSG_WAN_NON_MASTER:
        /* reset the partner timer */
        intfPoint->brParaSelf.neighbor.timer = 0;

/* check if same partner */
        if ( stp_id_cmp_nz( &msg->msg.wan.self.id, &intfPoint->brParaSelf.partner.id ) != 0 )
        {
            BrParaNewPartner( intfPoint, &msg->msg.wan.self, &msg->msg.wan.localLanId );
            goto brParaNextState;
        }

/* save basic partner data */
        intfPoint->brParaSelf.partner.state = msg->msg.wan.self.state;
        pathCostChange = ( intfPoint->brParaSelf.partner.pathCost != msg->msg.wan.self.pathCost );
        intfPoint->brParaSelf.partner.pathCost = msg->msg.wan.self.pathCost;
        intfPoint->brParaSelf.partner.buckets = msg->msg.wan.self.buckets;

/* check if same remote lan */
        if ( stp_id_cmp_nz( &msg->msg.wan.localLanId, &intfPoint->brParaRemoteLanId ) != 0 )
        {
            BrParaNewPartnerRemoteLan( intfPoint, &msg->msg.wan.localLanId );
            goto brParaNextState;
        }

/* validate the group master if not from a slave */
        if ( msg->hdr.type != BRPARA_MSG_WAN_SLAVE )
        {
            cmp = stp_id_cmp( &msg->msg.wan.groupMasterId, &intfPoint->brParaGroupMasterId );
            if ( cmp == 1 )
            {
                BrParaWanWorseMaster( intfPoint, &msg->msg.wan.groupMasterId );
                goto brParaNextState;
            }
            else if ( cmp == -1 )
            {
                BrParaWanBetterMaster( intfPoint, &msg->msg.wan.groupMasterId );
                goto brParaNextState;
            }
        }
        break;
}

/* packet handling */
switch( msg->hdr.type )
{
    case BRPARA_MSG_MASTER:
        cmp = stp_id_cmp( &msg->msg.master.groupMasterId, &intfPoint->brParaGroupMasterId );
        if ( cmp == 0 )
            BrParaSameMaster( intfPoint, msg );
        else if ( cmp == -1 )
            BrParaLanBetterMaster( intfPoint, msg );
        else
        {
            /* if the master has lowered its priority */
            if ( nlink_addr_cmp( &msg->msg.master.groupMasterId.id,
                                 &intfPoint->brParaGroupMasterId.id ) == 0 )
            {
if DEBUG
                if ( brParaDebug )
                {
                    do_dtx();
                    dprintf( "BrPara Group Master's Priority lowered for link %04X\n", intfPoint );
                }
endif
                /* if id is worse than ours */
                if ( stp_id_cmp( &msg->msg.master.groupMasterId,
                                 &intfPoint->brParaSelf.neighbor.id ) == 1 )
                {
```

```
                    intfPoint->brParaStateNew = BRPARA_STATE_BOTH_STABLE;
                    process_signal( intfPoint->brParaPcb, SIG_WAKEUP );
                }
                else
                {
                    stp_id_cpy( &intfPoint->brParaGroupMasterId,
                                &msg->msg.master.groupMasterId );
                    BrParaSameMaster( intfPoint, msg );
                }
            }
            else
                BrParaTransmit( intfPoint );
        }
        break;

case BRPARA_MSG_NON_MASTER:
        BrParaNeighborData( intfPoint, msg );
        break;

case BRPARA_MSG_SLAVE:
        /* if also in the slave state just save the data */
        BrParaSlaveData( intfPoint, msg );
        break;

case BRPARA_MSG_WAN_SLAVE:
        /* if master check the pathcost and buckets */
        /* may cause transition if new data is returned */
        BrParaWanSlave( intfPoint, msg, pathCostChange );
        break;

case BRPARA_MSG_WAN_MASTER_LONG:
        /* if in the slave state just save the data */
        BrParaWanMasterData( intfPoint, msg );
        /* fall through to test data */ case BRPARA_MSG_WAN_NON_MASTER:
    case BRPARA_MSG_WAN_MASTER:
        BrParaPartnerData( intfPoint, msg );
        break;
    } brParaNextState:
    BrParaStateMachine( intfPoint ); /* run after each packet */ brParaPacketFree:
    packet_free( packet );

}

GLOBAL VOID
BrParaInput( intfPoint )
    FAST INTF_DATA_STR      *intfPoint;
{
    FAST PACKET_STR         *packet;
    FAST BRPARA_MSG_STR     *msg;

while ( (packet = (PACKET_STR *)que_remhead( &intfPoint->brParaQue )) != NULL )
    {
        msg = (BRPARA_MSG_STR *) packet->ptr;

#if DEBUG
        if ( brParaDebug )
        {
            do_dtm();
            dprintf( "BrPara packet %d in for link %04X\n", msg->hdr.type, intfPoint );
        }
endif switch( intfPoint->brParaStateCur )
        {
        case BRPARA_STATE_BAD_TOPOLOGY:
        case BRPARA_STATE_OPERATER_DISABLE:
            packet_free( packet );
            break;

case BRPARA_STATE_NO_STABLE:
        case BRPARA_STATE_SAME_LAN:
        case BRPARA_STATE_REMOTE_STABLE:
        case BRPARA_STATE_LOCAL_STABLE:
        case BRPARA_STATE_BOTH_STABLE:
        case BRPARA_STATE_SLAVE:
        case BRPARA_STATE_NOT_MASTER_INIT:
        case BRPARA_STATE_NOT_MASTER_WAIT:
        case BRPARA_STATE_NOT_MASTER:
        case BRPARA_STATE_MASTER_INIT:
        case BRPARA_STATE_MASTER_WAIT:
        case BRPARA_STATE_MASTER:
```

```
        case BRPARA_STATE_MASTER_STOP:
            BrParaHandlePacket( intfPoint, packet );
            break;

default:
            crash( CRASH_BRPARA_BAD_STATE );
            break;
        }
    }

/************************************************************************
*************************************************************************
*****************  Timeout Handling Routines  **************************
*************************************************************************
************************************************************************/
GLOBAL VOID
BrParaMasterTimeout( intfPoint )
    FAST INTF_DATA_STR   *intfPoint;
{ if DEBUG
    if ( brParaDebug || brParaDebug2 )
    {
        cc_dtm();
        cprintf( "BrPara Master Timeout for link %04X\n", intfPoint );
    }
endif switch( intfPoint->brParaStateCur )
    {
        case BRPARA_STATE_SLAVE:
        case BRPARA_STATE_NOT_MASTER_INIT:
        case BRPARA_STATE_NOT_MASTER_WAIT:
        case BRPARA_STATE_NOT_MASTER:
            intfPoint->brParaStateNew = BRPARA_STATE_EOTH_STABLE;
            process_signal( intfPoint->brParaPcb, SIG_WAKEUP );
            break;

default:
            crash( CRASH_BRPARA_BAD_STATE );
            break;
    }
}

BrParaPartnerTimeout( intfPoint )
    FAST INTF_DATA_STR   *intfPoint;
{
if DEBUG
    if ( brParaDebug )
    {
        cc_dtm();
        cprintf( "BrPara Partner Timeout for link %04X\n", intfPoint );
    }
endif intfPoint->brParaRemoteLanId.priority = -1; /* set to noone */
    intfPoint->brParaSelf.partner.state = BRPARA_STATE_INIT;
    intfPoint->brParaStateNew = BRPARA_STATE_LOCAL_STABLE;
    process_signal( intfPoint->brParaPcb, SIG_WAKEUP );
}

BrParaNeighborTimeout( intfPoint, neighbor, neighborIndex )
    FAST INTF_DATA_STR     *intfPoint;
    FAST BRPARA_GROUP_STR  *neighbor;
    FAST UCOUNT            neighborIndex;
{
    FAST BRPARA_GROUP_STR  *nextNeighbor;
    FAST UCOUNT            i;

#if DEBUG
    if ( brParaDebug || brParaDebug2 )
    {
        cc_dtm();
        cprintf( "BrPara Neighbor %d of %d Timeout for link %04X\n",
                 neighborIndex, intfPoint->brParaGroupNumEntries, intfPoint );
    }
endif
```

```c
switch( intfPoint->brParaStateCur )
{
    case BRPARA_STATE_MASTER_INIT:
    case BRPARA_STATE_MASTER_WAIT:
    case BRPARA_STATE_MASTER:
    case BRPARA_STATE_MASTER_STOP:
        intfPoint->brParaGroupNumEntries--;
        for ( i = neighborIndex; i < intfPoint->brParaGroupNumEntries; i++ )
        {
            nextNeighbor = neighbor + 1;
            block_move( neighbor, nextNeighbor, sizeof( BRPARA_GROUP_STR ) );
            neighbor = nextNeighbor;
        }
        BrParaNewLoadBalance( intfPoint );
        break;

default:
        crash( CRASH_BRPARA_BAD_STATE );
        break;
    }
}

GLOBAL VOID
BrParaProcess( intfPoint )
    FAST INTF_DATA_STR      *intfPoint;
{
    FAST SIGNAL_MASK        events;
    FAST LCOUNT             i;
    FAST BRPARA_GROUP_STR   *group;

/* initialize the id fields */
    nlink_addr_cpy( &intfPoint->brParaSelf.neighbor.id.id, &intfPoint->link->link_addr
    intfPoint->brParaSelf.neighbor.id.priority = bridge_data.work.priority;
    stp_id_cpy( &intfPoint->brParaLocalLanId, &intfPoint->brParaSelf.neighbor );
    stp_id_cpy( &intfPoint->brParaGroupMasterId, &intfPoint->brParaSelf.neighbor );

/* initialize our config */
    BrParaSetConfig();

/* initialize our stp state */
    BrParaNewStpState();

/* initialize the pathcost */
    BrParaCalcPathcost( intfPoint );
    if ( bridge_data.work.parallel != BRIDGE_PARALLEL_AUTO )
        intfPoint->brParaStateNew = BRPARA_STATE_OPERATER_DISABLE;
    else if ( ! BrParaSamePartner() )
        intfPoint->brParaStateNew = BRPARA_STATE_BAD_TOPOLOGY;

BrParaStateMachine( intfPoint );

/* wait for listening to go by the first time */
    timer_set( intfPoint->brParaTimer, bridge_data.stp_forward_delay * 100 );

while ( TRUE )
    {
        events = process_wait( SIG_ANYTHING );

if ( events & SIG_RECEIVE )
        {
            BrParaInput( intfPoint );
        } if ( events & SIG_WAKEUP )
        {
            BrParaStateMachine( intfPoint );
        } if ( events & SIG_TIMEOUT )
        {
            if ( ( intfPoint->brParaTransmitTimer != BRPARA_TIMER_INACTIVE ) &&
                 ( ++intfPoint->brParaTransmitTimer >= intfPoint->brParaTransmitTimeout
            {
if DEBUG
                if ( brParaDebug )
                {
                    sc_dtm();
                    aprintf( "Transmit Timeout for link %04X\n", intfPoint );
                }
```

```
#endif
        BrParaTransmit( intfPoint );
        intfPoint->brParaTransmitTimer = 0;
    } if ( ( intfPoint->brParaMasterTimer != BRPARA_TIMER_INACTIVE ) &&
         ( ++intfPoint->brParaMasterTimer ) >= BRPARA_MASTER_TIMEOUT ) )
    {
        BrParaMasterTimeout( intfPoint );
    } if ( intfPoint->brParaBucketTimer != BRPARA_TIMER_INACTIVE )
    {
        for ( i = 1, group = intfPoint->brParaGroupData + 1;
              i < intfPoint->brParaGroupNumEntries; i++, group++ )
        {
if DEBUG
            if ( brParaDebug )
            {
                do_dtm();
                dprintf( "Increment Group %d from %d for link %04X\n",
                         i, group->neighbor.timer, intfPoint );
            }
endif
            if ( ++(group->neighbor.timer) >= BRPARA_NEIGHBOR_TIMEOUT )
            {
                BrParaNeighborTimeout( intfPoint, group, i );
                i--;       /* back up the deleted entries */
                group--;
            }
        }
    } if ( ( intfPoint->brParaSelf.neighbor.timer != BRPARA_TIMER_INACTIVE ) &&
         ( ++intfPoint->brParaSelf.neighbor.timer ) >= BRPARA_PARTNER_TIMEOUT ) )
    {
        BrParaPartnerTimeout( intfPoint );
    } timer_set( intfPoint->brParaTimer, BRPARA_TIMEOUT );

} /* end of while */
}
```

Other embodiments are within the following claims.
What is claimed is:

1. Apparatus for transmitting information packets over parallel paths between first and second terminals in a network having other terminals while maintaining conformity with a protocol that precludes establishing loops formed by links between terminals that allow information packets to recirculate indefinitely comprising, first and second terminals,
a first pair of bridges interconnected by a first link with each bridge connected to a respective one of said first and second terminals,
a second pair of bridges interconnected by a second link with each bridge connected to a respective one of said first and second terminals,
a bridge in each of said first pair of bridges and said second pair of bridges being designatable as a master bridge and having a forwarding/filtering module for forwarding and filtering information packet transfer between said first and second terminals, a topology recognition/traffic assignment module for sensing the existence of said first and second links between said first and second terminals and assigning information packets to respective ones of said first and second links for transferring between said first and second terminals, and a spanning tree module for providing a spanning tree bridge identifier signal,
and a spanning tree bridge identifier signal sensor for sensing said spanning tree bridge identifier signal and designating as a master that bridge having the spanning tree bridge identifier signal meeting a predetermined condition,
wherein said spanning tree bridge identifier signal is characterized by a quantizable value and said spanning tree bridge identifier signal sensor designates as the master that bridge having the spanning tree bridge identifier signal with a value that is one of lower and higher than the values of all other spanning tree bridge identifier signals for other bridges in parallel paths between said first and second terminals.

2. Apparatus for transmitting information packets over parallel paths between first and second terminals in a network having other terminals while maintaining conformity with a protocol that precludes establishing loops formed by links between terminals that allow information packets to recirculate indefinitely comprising, a first LAN,
a second LAN,
said LANs being remotely located with respect to each other,
parallel communication paths between said first LAN and said second LAN,
each of said parallel communication paths including a bridge pair having first and second bridges connected by at least one link, said first and second bridges respectively connected to said first LAN and said second LAN, a topology recognizer for recognizing a parallel topology including all parallel communication paths between said first LAN and said second LAN, a selector for selecting one of said bridges as a master bridge for controlling the transmission of information packets over the respective parallel communication paths, a source of effective link costs signals representative of the effective cost for transmitting information packets over the respective parallel communication paths, a traffic assigner for providing assigned bucket value signals representative of at least one unique bucket value associated with each of said bridges in said parallel topology which signals are representative of assigned bucket values characterizing respective ones of said parallel communication paths, a forwarder responsive to each information packet for providing an observed bucket value signal characteristic of the respective information packet, and a comparator for comparing the observed bucket value signals representative of observed bucket values with the assigned bucket value signals representative of assigned bucket values and transmitting the associated information packet over that one of said parallel communication paths characterized by an assigned bucket value that bears a predetermined relationship to the observed bucket value associated with the latter information packet.

3. Apparatus for transmitting information packets over parallel paths in accordance with claim 2 and further comprising a use monitor associate with each of said parallel communication paths for providing an average utilization signal representative of the average data transmission over a respective parallel communication path, means for transmitting the average utilization signals to said master bridge, said master bridge being responsive to each average utilization signal for altering the assigned bucket values associated with said bridges so as to improve the efficiency of transmission of information packets over said parallel communication paths.

4. A method of channelling information packets in a parallel bridge computer network, said method comprising recognizing a parallel topology including all parallel communication paths between a first local area network and a second local area network, said local area networks being remotely located with respect to each other, each of said paths including a bridge pair, said bridge pair including two bridges connected by at least one link, one bridge of a bridge pair connected to the first local area network and the other bridge of a bridge pair connected to the second local area network;

selecting a master bridge from all of said bridges in the parallel topology for controlling the transmission of information packets over all said bridges;

providing a signal representative of an effective link data signal transmission cost based on an individual cost associated with transmitting data signals on each link in the parallel topology, providing at least one unique bucket value signal characteristic of a respective bridge pair in the parallel topology as an assigned bucket value signal;

processing an information packet received from a local area network to which a bridge is connected to provide an observed bucket value signal for that information packet;

comparing said observed bucket value signal with said assigned bucket value signal;

passing the information packet over said at least one link when said observed bucket value signal has a predetermined relationship to said assigned bucket value signal;

providing to said master bridge respective utilization signals representative of the average utilization of a respective bridge pair for information packet transmission;

processing said utilization signals, and reassigning assigned bucket value signals to each bridge pair characterized by an unacceptable utilization signal.

5. Apparatus for transmitting information packets over parallel paths between first and second terminals in a network having other terminals while maintaining conformity with a protocol that preclude establishing loops formed by links between terminals that allow information packets to recirculate indefinitely comprising, a first LAN, a second LAN, said LANs being remotely located with respect to each other, parallel communication paths between said first LAN and said second LAN, each of said parallel communication paths including a bridge pair having first and second bridges connected by at least one link, said first and second bridges respectively connected to said first LAN and said second LAN, means for recognizing a parallel topology including all said parallel communication paths, means for selecting a master bridge from all of said bridges in the parallel topology for controlling information packet flow over all said bridges, means for determining an effective link data signal transmission cost based on the individual costs associated with transmitting information packets on each link in the parallel topology, means for assigning at least one unique bucket value signal to each bridge pair in the parallel topology, means for processing an information packet received from a local area network to which a bridge is connected to determine an observed bucket value signal for that information packet, means for comparing said observed bucket value signal with said at least one assigned bucket value signal, means for passing the information packet over said at least one link when said observed bucket value signal has a predetermined relationship to said assigned bucket value signal, means for providing to said master bridge utilization signals representative of the average utilization of respective bridge pairs for transmitting information packets, and means for processing said utilization signals and reassigning assigned bucket value signals to each bridge pair characterized by an unacceptable utilization signal.

* * * * *